United States Patent
Ono

(10) Patent No.: US 11,082,223 B2
(45) Date of Patent: Aug. 3, 2021

(54) COMMUNICATION DEVICE, COMMUNICATION METHOD, AND RECORDING MEDIUM

(71) Applicant: NEC Corporation, Tokyo (JP)

(72) Inventor: Masakazu Ono, Tokyo (JP)

(73) Assignee: NEC CORPORATION, Tokyo (JP)

(*) Notice: Subject to any disclaimer, the term of this patent is extended or adjusted under 35 U.S.C. 154(b) by 199 days.

(21) Appl. No.: 16/336,347

(22) PCT Filed: Oct. 2, 2017

(86) PCT No.: PCT/JP2017/035815
§ 371 (c)(1),
(2) Date: Mar. 25, 2019

(87) PCT Pub. No.: WO2018/066509
PCT Pub. Date: Apr. 12, 2018

(65) Prior Publication Data
US 2019/0238332 A1    Aug. 1, 2019

(30) Foreign Application Priority Data
Oct. 3, 2016  (JP) .............................. JP2016-195775

(51) Int. Cl.
*H04L 9/08*    (2006.01)
*H04L 9/12*    (2006.01)
*H04L 9/16*    (2006.01)

(52) U.S. Cl.
CPC .............. *H04L 9/12* (2013.01); *H04L 9/0861* (2013.01); *H04L 9/0894* (2013.01); *H04L 9/16* (2013.01)

(58) Field of Classification Search
CPC . H04L 9/12; H04L 9/0861; H04L 9/16; H04L 9/0894
See application file for complete search history.

(56) References Cited

U.S. PATENT DOCUMENTS

2002/0006202 A1    1/2002    Fruehauf et al.
2003/0156721 A1    8/2003    Widman
(Continued)

FOREIGN PATENT DOCUMENTS

| JP | 2003-101528 A | 4/2003 |
| JP | 2014-099793 A | 5/2014 |
| JP | 2016-025532 A | 2/2016 |

OTHER PUBLICATIONS

International Search Report of PCT/JP2017/035815 dated Oct. 31, 2017 [PCT/ISA/210].
(Continued)

*Primary Examiner* — Alexander Lagor
*Assistant Examiner* — Vu V Tran
(74) *Attorney, Agent, or Firm* — Sughrue Mion, PLLC

(57) ABSTRACT

A communication device according to the present invention includes: a memory; and at least one processor coupled to the memory. The processor performs operations. The operations includes: storing device information that is information stored commonly in one or more communication devices; generating clock information representing timing by using a periodic clock signal; selecting at least a part of the device information according to the clock information; generating selection information that is different information for each piece of the clock information from at least a part of the device information selected; generating an encryption key by using at least the clock information and the selection information generated; and executing at least one of encryption processing and decryption processing on communication data by using the encryption key generated.

12 Claims, 19 Drawing Sheets

(56) References Cited

U.S. PATENT DOCUMENTS

| | | | |
|---|---|---|---|
| 2004/0172535 A1 | 9/2004 | Jakobsson et al. | |
| 2011/0010552 A1 | 1/2011 | Hoornaert et al. | |
| 2013/0013657 A1* | 1/2013 | Emelko | G06F 7/588 708/251 |
| 2014/0226813 A1* | 8/2014 | Heffner | H04L 9/0866 380/44 |
| 2015/0156184 A1* | 6/2015 | Tucker | H04L 63/0876 713/168 |
| 2015/0318985 A1* | 11/2015 | Graceffo | H04L 43/0864 380/255 |

OTHER PUBLICATIONS

Written Opinion of PCT/JP2017/035815 dated Oct. 31, 2017 [PCT/ISA/237].
Communication dated Sep. 4, 2019, from the European Patent Office in application No. 17858347.2.

* cited by examiner

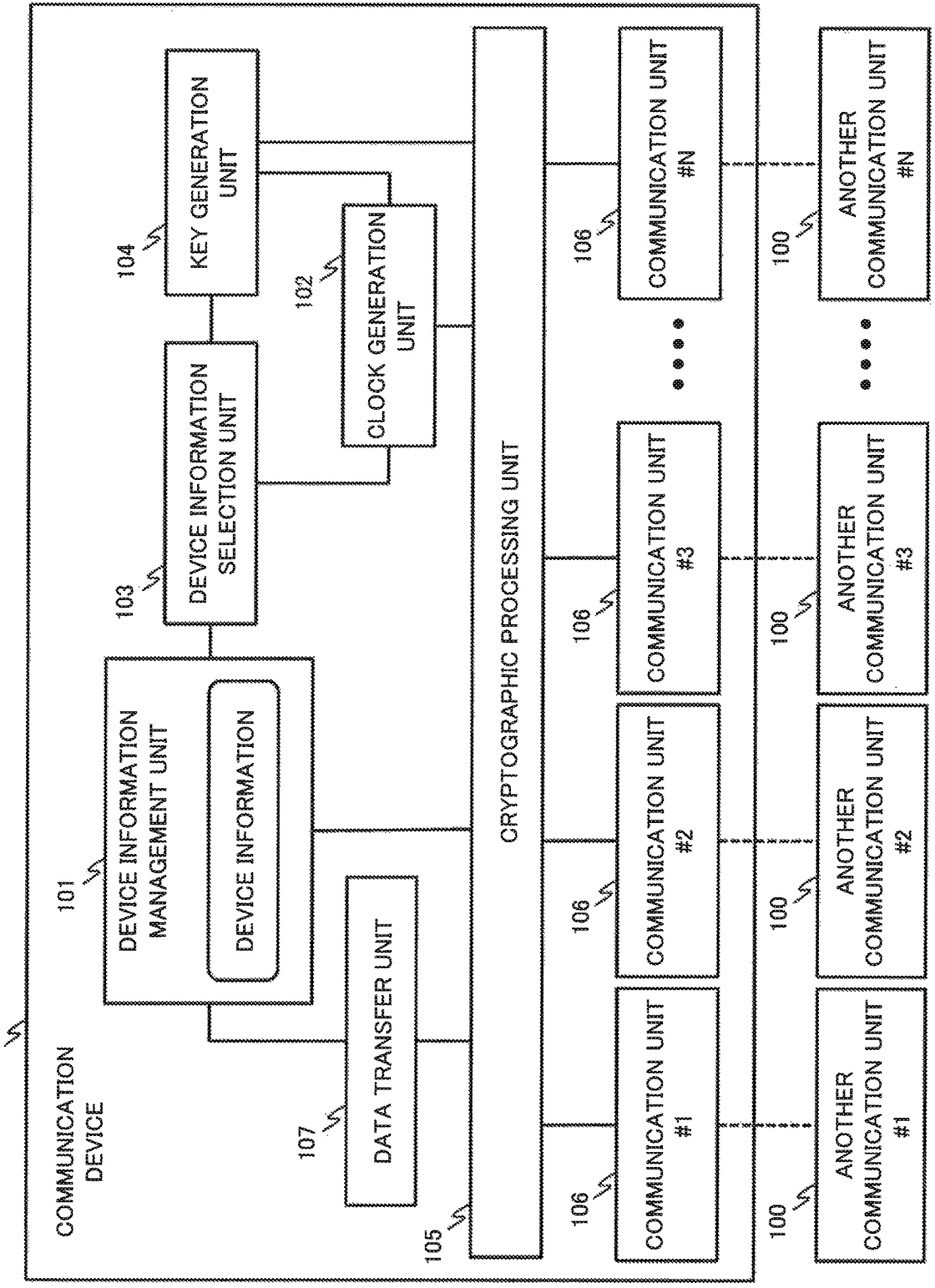

COMMUNICATION DEVICE, COMMUNICATION METHOD, AND RECORDING MEDIUM

CROSS REFERENCE TO RELATED APPLICATIONS

This application is a National Stage of International Application No. PCT/JP2017/035815, filed Oct. 2, 2017, claiming priority to Japanese Patent Application No. 2016-195775, filed Oct. 3, 2016, the contents of all of which are incorporated herein by reference in their entirety.

TECHNICAL FIELD

The present disclosure relates to a technique for performing communication using encrypted communication data.

BACKGROUND ART

In recent years, a communication method for transmitting and receiving encrypted data between communication devices (hereinafter referred to as "encryption communication") is widely used. In encryption communication, each communication device performs encryption processing and decryption processing of communication data by using secret information (for example, key). Hereinafter, the encryption processing and decryption processing of data are collectively described as "encryption processing". Non-encrypted data is referred to as "plain-text data", and data acquired by encrypting plain-text data is referred to as "cipher-text data". The key used for encryption and the key used for decryption are collectively referred to as "encryption key". The key used for encryption and the key used for decryption may be the same key data (for example, a common key cryptosystem), or may be a pair of different key data (for example, a public key cryptosystem).

If an encryption key is leaked, the cipher-text encrypted by using the encryption key is compromised. Also, increasing the number of encrypted cipher-texts encrypted by using the same encryption key may give attackers clues for attacking cryptographic processing. Therefore, in encryption communication, the encryption key may be changed as appropriate.

Techniques related to such encryption communication are described in Patent Literature (PTL) 1. That is, PTL 1 discloses a method in which a terminal and a host have key data tables which have the same contents in advance, and select the encryption key from the key data tables by using clock data synchronized between the terminal and the host.

CITATION LIST

Patent Literature

[PTL 1] Japanese Patent Laid-Open No. 2003-101528

SUMMARY OF INVENTION

Technical Problem

When each communication device executes encryption communication, an encryption key used for encryption processing is distributed to each communication device. However, depending on the environment in which the communication device is deployed and the situation in which the communication device operates, distribution of such encryption key may not be easy in some cases.

For example, from the viewpoint of reducing the risk of leakage of the encryption key, the encryption key may be distributed to each communication device offline (that is, without going through a communication path). In this case, depending on the deployment location of the communication device and the number of communication devices, it is not always easy to manually distribute the encryption key to each communication device. When it is not easy to distribute the encryption key, there is a possibility that the encryption key cannot be changed appropriately. In other words, there is a possibility that each communication device cannot use an encryption key properly from a viewpoint of security in encryption communication.

Incidentally, instead of distributing an encryption key, above-mentioned PTL 1 describes a method of changing an encryption key by selecting an encryption key from a prepared key data table. In such a technique, the variation of the encryption key is limited to the encryption key registered in the key data table in advance. Therefore, the improvement in the safety by changing encryption key is considered to be limited. Also, in the technology relating to PTL 1, there is no consideration of a method for appropriately changing the key data table itself when the key data table itself is compromised.

The present disclosure has been made in view of the above circumstances. It is an object of the present disclosure to provide a technique that enables a communication device to execute encryption communication using an appropriate encryption key.

Solution to Problem

To achieve the above object, a communication device according one aspect of the present disclosure includes:
a memory; and
at least one processor coupled to the memory.
The processor performs operations. The operations includes:
storing device information that is information stored commonly in one or more communication devices;
generating clock information representing timing by using a periodic clock signal;
selecting at least a part of the device information according to the clock information; generating selection information that is different information for each piece of the clock information from at least a part of the device information selected;
generating an encryption key by using at least the clock information and the selection information generated; and
executing at least one of encryption processing and decryption processing on communication data by using the encryption key generated.

Furthermore, a communication method according to one aspect of the present disclosure includes:
generating clock information representing timing by using a periodic clock signal;
selecting at least a part of device information that is information commonly stored in one or more communication devices in accordance with the clock information;
generating selection information that is different information for each piece of the clock information from at least a part of the device information selected;
generating an encryption key by using at least the clock information and the selection information generated; and executing at least one of encryption processing and decryption processing on communication data by using the encryption key generated.

The similar object can be achieved by a computer program achieving the communication device including the above-mentioned configuration or the communication method by a computer, a computer-readable recording medium storing the computer program, and the like.

That is, a computer program according one aspect of the present disclosure causes a computer constituting a communication device to perform a method. The method includes:

generating clock information representing timing by using a periodic clock signal;

selecting at least a part of the device information that is information commonly stored in one or more communication devices in accordance with the clock information;

generating selection information that is different information for each piece of the clock information from at least part of the device information selected;

generating an encryption key by using at least the clock information and the selection information generated; and executing at least one of encryption processing and decryption processing on communication data by using the encryption key generated.

Advantageous Effects of Invention

According to the present disclosure, each communication device can execute encryption communication using an appropriate encryption key.

BRIEF DESCRIPTION OF DRAWINGS

FIG. 1A is a block diagram illustrating a functional configuration of a communication device according to a first example embodiment of the present disclosure.

EXAMPLE EMBODIMENT

Figure 1B:
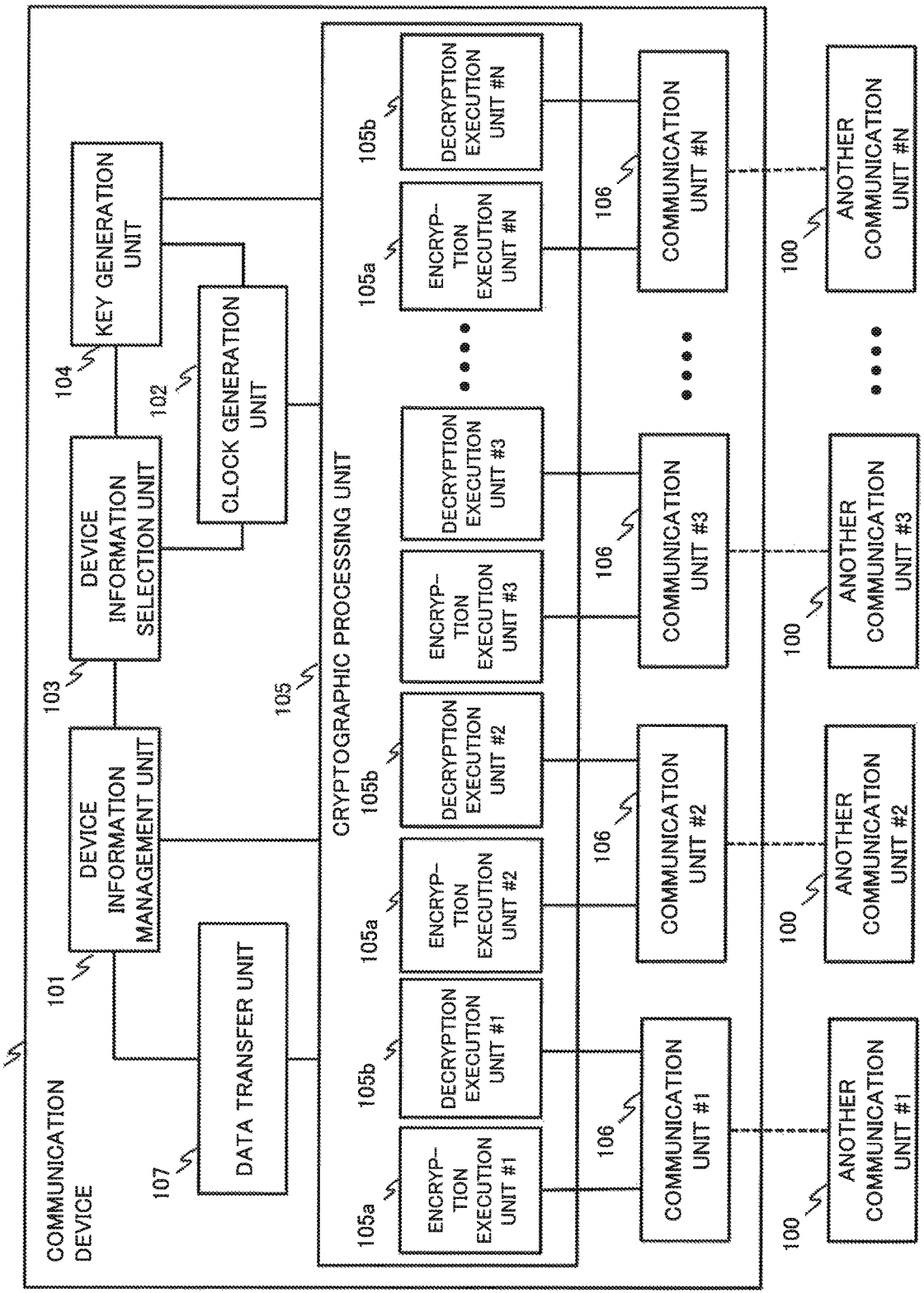
FIG. 1B is a block diagram illustrating another functional configuration of the communication device according to the first example embodiment of the present disclosure.

Before describing the example embodiment of the present disclosure, technical considerations and the like concerning the present disclosure will be described in more detail.

As described above, each communication device capable of executing encryption communication has an encryption key used for cryptographic processing on communication data. For example, when a common key cryptosystem is used, a certain communication device executes cryptographic processing on communication data by using a common encryption key with another communication devices. For example, when the public key cryptosystem is used, a certain communication device encrypts communication data by using a public key disclosed by another communication device. In this case, a communication device that receives the encrypted communication data decrypts the communication data by using the secret key. In either case, the encryption key is distributed to each communication device.

In encryption communication, increasing encrypted data with the same encryption key causes to increase cryptanalysis clues available to attackers. From the viewpoint of reducing such risks, in encryption communication, processing for appropriately changing the encryption key is executed.

When the encryption key is changed, an encryption key may be distributed to each communication device. The general method of distributing encryption key by online (that is, via a communication line) is widely used. However, for example, in the unlikely case that an encryption key is leaked in the distribution of encryption key on-line, the executor of encryption communication may not be aware of leakage of the encryption key and decryption of communication data by an attacker.

One way to reduce the risk associated with the leakage of the encryption key is to distribute the encryption key offline (that is, without passing through a communication line). As a method of distributing the encryption key offline, for example, the executor of the encryption communication and the user of the communication device (hereinafter simply referred to as "user") can manually distribute the encryption key to each communication device. However, when the number of communication devices is large, or when the place where the communication devices are disposed are far away, it is not always easy to manually distribute the key to each communication device. If distribution of encryption key is not easy, there is a possibility that the encryption key cannot be changed at an appropriate timing. This may cause safety issues in encryption communication.

Therefore, in each example embodiment of the present disclosure described below, a communication device and the like capable of solving the issue of key distribution by offline will be described. For example, the communication device in each example embodiment generates an encryption key by using information stored by each communication device and information that varies with the elapse of time (for example, a time value, an elapsed time, a counter value that increases and decreases according to time or elapsed time, and the like). For example, when information used for generating an encryption key is common in each communication device, each communication device can generate a common encryption key. Thus, each communication device can use a common encryption key, for example, without explicitly distributing encryption keys to each other. Each example embodiment will be described in detail below.

Note that the configuration of the communication device described in each of the following example embodiments are examples, and the technical scope of the present disclosure is not limited thereto. The division of the constituent elements constituting the communication device (for example, division by functional unit) in each of the following example embodiments is an example with which the communication device can be realized. When implementing the communication device, it is not limited to the following example, and various configurations are assumed. That is, the constituent elements constituting the communication device in each of the following example embodiments may be further divided, and one or more constituent elements may be integrated.

The communication device described below may be configured by using a single device (physical or virtual device), or may be realized by using a plurality of separated devices (physical or virtual devices). A communication device described below or a hardware configuration capable of realizing its constituent elements will be described later.

First Example Embodiment

Hereinafter, a communication device according to a first example embodiment of the present disclosure will be described.

[Functional Configuration]

FIG. 1A is a block diagram illustrating a functional configuration of a communication device 100 according to this example embodiment.

The communication device 100 is a device capable of executing encryption communication. A single communication device 100 is communicative connected to one or more other communication devices 100. The communication path connecting each communication device 100 may be realized by, for example, wireless communication, wired communication, or a combination thereof. Further, the communication protocol used for such communication is not particularly limited and may be appropriately selected.

As illustrated in FIG. 1A, the communication device 100 includes a device information management unit 101, a clock generation unit 102, a device information selection unit 103, a key generation unit 104, and a cryptographic processing unit 105. The communication device 100 may include a communication unit 106 and a data transfer unit 107. These components constituting the communication device 100 may be connected such that data, command, and the like can be transmitted. These components constituting the communication device 100 will be described below.

The device information management unit 101 stores (saves) data (hereinafter referred to as "device information") used for generating an encryption key in encryption communication. The device information management unit 101 may store, for example, information unique to the communication device 100 (for example, information about a device included in the communication device 100 and the like) as device information. Further, the device information management unit 101 may store data (for example, various setting information etc.) given from the outside to the communication device 100 as device information.

As specific device information, for example, the following information can be used. That is, as the device information, a CPUID which is an identifier (ID) capable of identifying a central processing unit (CPU) included in the communication device may be used. As the device information, for example, a media access control (MAC) address assigned to a communication interface included in the communication device may be used. As the device information, for example, a serial number, a model number, or the like of the communication device 100 may be used. The present invention is not limited thereto, and other appropriate information may be selected as the device information.

As one variation of the above-mentioned device information, the device information management unit 101 may store certain specific common data included in all the communication devices 100 in common. Such specific common data may be appropriately set in various scenes such as manufacture, deployment, operation, maintenance, and the like of the communication device 100, for example. The specific common data may be, for example, a key (pre-shared key) commonly stored by each communication device 100. Note that it is not indispensable for the communication device 100 to store the pre-shared key. In other words, the communication device 100 may or may not store the pre-shared key as necessary.

For example, device information about the same contents may be given in advance to a certain communication device 100 and another communication device 100. For example, the certain communication device 100 and another communication device 100 may store device information of the same contents by transmitting and receiving data mutually. The certain communication device 100 and another communication device 100 may generate device information of the same contents by executing predetermined calculations using the data stored thereby.

The clock generation unit 102 is configured to generate clock information, which is information representing timing, by using a periodic clock signal. The clock generation unit 102 can provide the generated clock information to other elements of the communication device 100.

The clock generation unit 102 generates a clock signal by using, for example, an appropriate device (oscillation device or the like) capable of generating a clock signal satisfying a predetermined frequency precision. More specifically, the clock generation unit 102 may generate a clock signal by using, for example, an atomic clock including a rubidium atom oscillator, a cesium atom oscillator, or the like. In this case, the clock generation unit 102 can generate a clock signal with extremely high accuracy (for example, a frequency precision of about "±5×10E-11").

Instead of using an extremely high-precision device such as atomic clock, the clock generation unit 102 may generate a clock signal by using, for example, a general crystal oscillator. In this case, the clock generation unit 102 may maintain the accuracy of the clock signal by appropriately adjusting the clock signal. For example, the clock generation unit 102 may adjust the clock signal so that the rising timing or the falling timing of the clock signal matches specific timing. The specific timing for adjusting the clock signal may be, for example, periodic timing or timing representing a specific time.

The clock generation unit 102 may adjust the clock signal by using, for example, time information provided from the outside of the communication device 100. The method according to which the clock generation unit 102 acquires the time information is not particularly limited, and an appropriate method may be adopted. As an example of a method of acquiring time information, the clock generation unit 102 may acquire a time method from, for example, a global positioning system (GPS) signal, a standard radio signal (JJY), or the like. The clock generation unit 102 may acquire time information from a network time protocol (NTP) server, for example, via a communication unit 106 (described later). Since accurate time information generated by using atomic clock can be acquired from GPS, standard wave, NTP, the clock generation unit 102 can adjust the clock signal by using accurate time information.

The clock information generated by the clock generation unit 102 may be, for example, information representing a periodic clock signal itself. Alternatively, the clock information may be information representing a counter value acquired by counting clock signals from a certain timing. Further, the clock generation unit 102 may generate clock information including information representing time. In this case, the clock generation unit 102 can generate the clock information including the time at a certain timing by using the time information acquired from the outside and the generated clock signal. Further, the clock generation unit 102 may generate clock information including information representing an elapsed time from a certain timing.

The clock generation unit 102 may be configured to perform processing to adjust the difference of clock information with another communication device 100. Processing for adjusting the difference of the clock information will be described later.

The device information selection unit 103 selects at least a part of the device information stored in the device information management unit 101 according to the clock information provided from the clock generation unit 102, and generates selection information which is different information depending on the clock by using the selected information. That is, the device information selection unit 103 generates different information for each clock information by using at least a part of the device information stored in the device information management unit 101. Hereinafter, a method of selecting at least a part of the device information stored in the device information management unit 101 may be referred to as "selection algorithm".

A specific method of generating selection information is not particularly limited. The device information selection unit 103 may generate different information according to the clock information by executing, for example, a prescribed arithmetic processing with the device information and the clock information as an input, for example.

The device information selection unit 103 may convert the clock information provided from the clock generation unit 102 into a representative value (for example, an upper limit value, a lower limit value, a median value, and the like of the range) for each specific range regarding the clock information.

For example, when the clock information represents time, the device information selection unit 103 may convert the time represented by the clock information into a representative value of a certain time range. As one specific example, it is assumed that the time range is set to "10 seconds". In this case, for example, the device information selection unit 103 may convert the time of 0 second or more and less than 10 seconds into "0 second" which is the representative value (lower limit value). Similarly, for example, the device information selection unit 103 may convert the time of 10 seconds or more and less than 20 seconds into "10 seconds" which is a representative value (lower limit value). This also applies to a time of 20 seconds or more. Note that the time range may be a shorter time range (e.g., in units of milliseconds), and may be a longer time range (e.g., minute, hour, and the like).

For example, when the clock information represents a counter value, the device information selection unit 103 may convert the counter value represented by the clock information into a representative value of a certain range. For example, it is assumed that "100" is set as the range of the counter value. In this case, for example, the device information selection unit 103 may convert a counter value of 0 or more and less than 100 to "0" which is a representative value (lower limit value). Similarly, for example, the device information selection unit 103 may convert a counter value of 100 or more and less than 200 into a representative value (lower limit value) of "100". This also applies to a counter value of 200 or more. The range of the counter value may be a smaller range or a larger range.

By the processing as described above, the device information selection unit 103 can absorb the influence of the fluctuation by using the representative value as the clock information even when the clock information varies within the predetermined range.

Hereinafter, a specific example of a method for generating selection information will be described.

For example, it is assumed that the device information management unit 101 stores, as device information, data representing "i pieces" (i is a positive integer) of information, i.e., "device information #1", "device information #2", "device information #3", . . . , "device information #i".

As a method of selecting at least a part of the device information, the device information selection unit 103 may select one or more pieces of device information from i pieces of device information according to, for example, clock information. For example, the device information selection unit 103 may treat the clock information as a numerical value and calculate a remainder (hereinafter referred to as "mod i") for the numerical value by "i". Then, the device information selection unit 103 may select the "mod i"-th device information among the i pieces of device information.

As another method of selecting at least a part of the device information, the device information selection unit 103 divides, for example, data representing device information into one or more parts, and in accordance with the clock information, the device information selection unit 103 may select one or more of the parts.

More specifically, for example, the device information selection unit 103 selects one or more pieces of device information among the device information #1 to device information #i, and divides the data representing the device information into n (n is a natural number) parts. For example, the device information selection unit 103 may equally divide the data into n pieces according to the size of the data representing the device information. The method of dividing the data representing the device information is not limited thereto, and an appropriate method may be appropriately selected. The device information selection unit 103 may select one or more parts from the data representing each piece of device information and combine the one or more parts.

As another method of selecting at least a part of the device information, for example, the device information selection unit 103 may generate data acquired by selecting one or more pieces of device information from i pieces of device information according to the clock information and randomly arranging the one or more pieces of device information.

As another method of selecting at least a part of the device information, the device information selection unit 103 may extract, according to the clock information, some data from the data acquired by concatenating i pieces of device information. For example, it is assumed that the size of data in which i pieces of device information are arranged is "N" bits (bits). The device information selection unit 103 may randomly select data of "n" bits from data of "N" bits. In this case, for example, the device information selection unit 103 generates "n" random numbers, which are 1 or more but are "N" or less, with the clock information being a seed. When the value of a certain random number is "j" ($1 \leq j \leq N$), the device information selection unit 103 extracts the data of the "j"-th bit from the "N" bit data. By executing the above processing on "n" random numbers, the device information selection unit 103 can extract at least "n" bits of data.

The method of selecting at least part of the device information is not limited to the above example. The device information selection unit 103 may appropriately combine the above methods as a method of selecting at least a part of the device information or may adopt a method different from the above as appropriate. According to the above processing, the device information selection unit 103 can select at least a part of the device information according to the clock information.

The device information selection unit 103 may provide the selected one or more pieces of device information (or a part thereof) as selection information as it is. When the device information management unit 101 has a sufficiently large variation of the device information, the device information selection unit 103 can provide different selection information according to the clock information.

Further, the device information selection unit 103 may provide the result of executing a prescribed arithmetic processing using the selected device information (or a part thereof) and the clock information as selection information. For example, the device information selection unit 103 may calculate a hash value of data including selected device information and clock information (for example, data acquired by combining selected device information and clock information), and may provide the hash value as selection information. The device information selection unit 103 may use a cryptographically safe hash function (for example, secure hash algorithm (SHA)-2 or the like) as a hash function. As a result, even when variation of the device information stored by the device information management unit 101 is relatively few, it is possible to generate different information according to clock information as selection information. That is, it is possible to increase the variation of the information used for generating the encryption key. Further, since it is difficult to calculate the original data (for example, a part of the device information) from the hash value, it is possible to conceal the data used for generating the selection information.

The key generation unit 104 generates an encryption key by using the clock information provided from the clock generation unit 102 and the selection information generated by the device information selection unit 103.

For example, the key generation unit 104 may generate a random number by using a known cryptographically-safe pseudo-random number generator with the selection information and the clock information being seeds, and provide the random number as the encryption key. Alternatively, for example, the key generation unit 104 may provide, as the encryption key, a result acquired by encrypting the clock information by using a known cryptographically-safe encryption algorithm with using the selection information as a key. Alternatively, the key generation unit 104 may provide, as the encryption key, hash values of the selection information and the clock information. The hash values are calculated by using an appropriate hash function. As a result, the key generation unit 104 can generate different encryption keys depending on the selection information and the clock information.

Note that, similarly to the device information selection unit 103, the key generation unit 104 may convert the clock information provided from the clock generation unit 102 into a representative value for each predetermined range regarding the clock information. Thus, even when the clock information fluctuates within a predetermined range, the key generation unit 104 can absorb the influence of the fluctuation by using the representative value as the clock information.

The key generation unit 104 is configured to change (update) the encryption key at an appropriate timing. By changing (updating) the encryption key by the key generation unit 104, it is possible to appropriately maintain the security of the encryption communication.

More specifically, for example, the key generation unit 104 may periodically generate an encryption key and provide the encryption key to the cryptographic processing unit 105 (described later). For example, the key generation unit 104 may generate the encryption key at a specific timing and provide the encryption key to the cryptographic processing unit 105. For example, the key generation unit 104 may generate an encryption key in response to a request from the cryptographic processing unit 105 and provide the encryption key to the cryptographic processing unit 105.

The key generation unit 104 may store a setting value representing the timing to change the encryption key. For example, when the clock information includes time information, the time at which the encryption key is changed may be set as such setting value. For example, when the clock information includes a counter value, a counter value at which the encryption key is changed may be set in such setting.

The cryptographic processing unit 105 executes cryptographic processing by using the encryption key generated by the key generation unit 104. The encryption algorithm used by the cryptographic processing unit 105 for cryptographic processing is not particularly limited, and it is possible to adopt, for example, a well-known encryption algorithm confirmed to be cryptographically safe.

The cryptographic processing unit 105 receives the communication data encrypted from the communication unit 106, and decrypts the communication data by using the key data generated by the key generation unit 104. The cryptographic processing unit 105 may provide the decrypted communication data to the data transfer unit 107. Further, the cryptographic processing unit 105 encrypts the communication data of plain-text provided from the data transfer unit 107 by using the encryption key generated by the key generation unit 104, and provides the communication data to the communication unit 106.

When there are a plurality of communication units 106 (described later), the cryptographic processing unit 105 may be configured to execute cryptographic processing in parallel for each communication unit 106 as illustrated in FIG. 1B. For example, an encryption execution unit 105*a* executes processing to encrypt the communication data of plain-text by using the encryption key. Further, a decryption execution unit 105*b* receives the encrypted communication data from the communication unit 106, and decrypts the communication data by using the encryption key. The encryption execution unit 105*a* and the decryption execution unit 105*b* may be realized as software programs such as threads, processes, tasks, and the like. Alternatively, the encryption execution unit 105*a* and the decryption execution unit 105*b* may be realized as, for example, hardware circuit elements capable of executing parallel processing.

The cryptographic processing unit 105 may be configured to notify as to whether or not the communication data received from another communication device 100 is correctly decrypted to another communication device 100 by using the communication unit 106.

The communication unit 106 transmits and receives the communication data encrypted by the cryptographic processing unit 105 to and from another communication device 100. More specifically, the communication unit 106 receives the encrypted communication data from the cryptographic processing unit 105 and transmits the encrypted communication data to another communication device 100. The communication unit 106 provides the cryptographic processing unit 105 with the encrypted communication data received from another communication device 100.

The communication device 100 may be provided with one or more the communication units 106. Each of the communication units 106 may transmit and receive communication data to and from another communication device 100. That is, the communication unit 106 may correspond one-to-one with another communication device 100 through which the communication unit 106 transmits and receives communication data. Alternatively, a single communication unit 106 may be communicatively connected to a plurality of other communication devices 100.

The communication unit 106 may measure the delay occurring in the communication path between the communication unit 106 and another communication device 100 that transmits and receives communication data. A well-known technique may be adopted as a method for measuring the delay in the communication path.

The data transfer unit 107 executes transfer processing related to communication data. The data transfer unit 107 analyzes communication data of plain-text provided from, for example, the cryptographic processing unit 105, and executes processing such as routing or switching on the communication data.

The data transfer unit 107 may be configured to receive data generated internally or externally of the communication device 100, to encrypt the data by the cryptographic processing unit 105, and to transmit the encrypted data to another communication device 100 via the communication unit 106.

[Hardware Configuration]

Figure 2A:
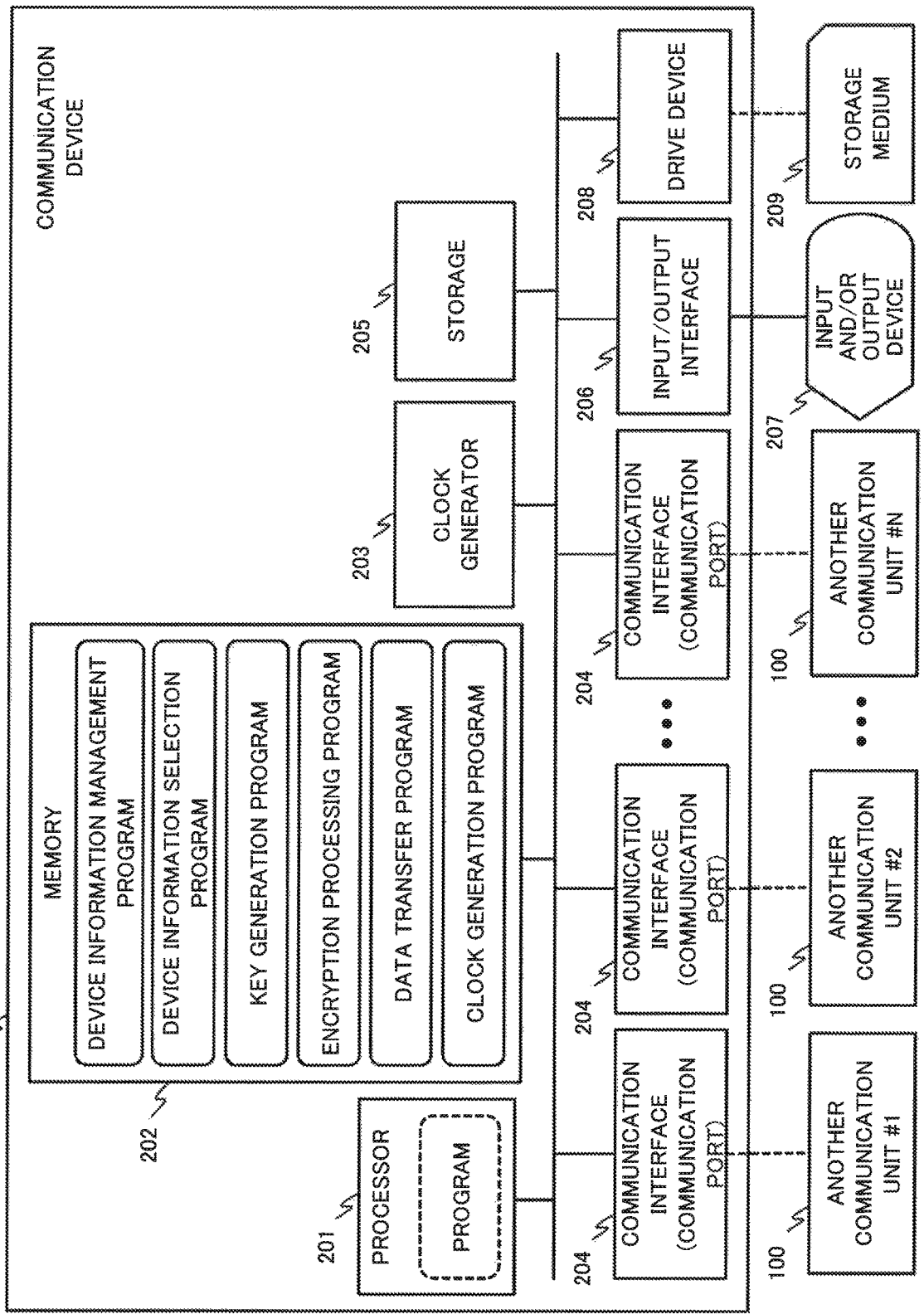
FIG. 2A is an explanatory diagram illustrating an example of a hardware configuration capable of realizing the communication device according to the first example embodiment of the present disclosure.
Figure 2B:
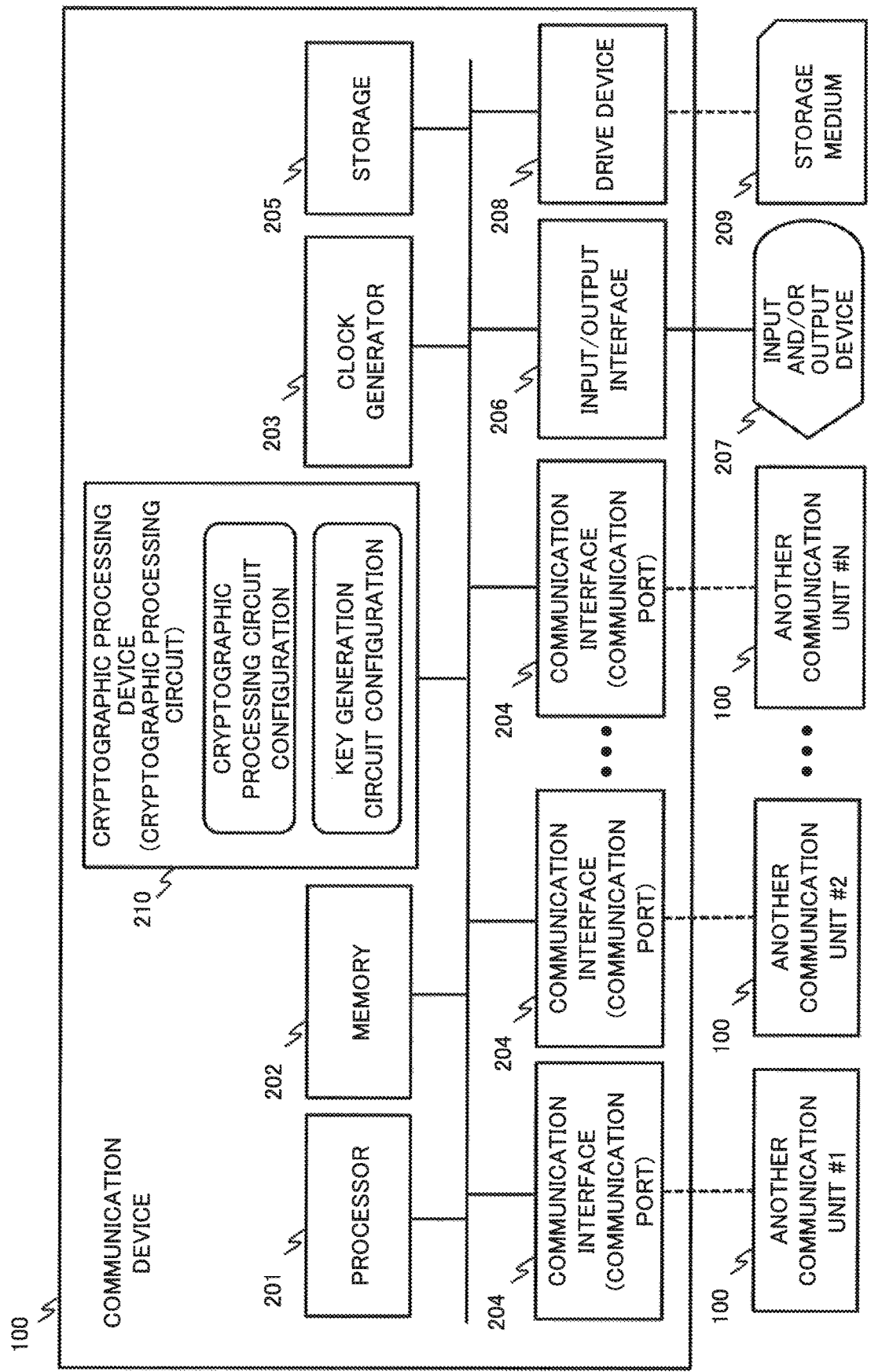
FIG. 2B is an explanatory diagram illustrating another example of a hardware configuration capable of realizing the communication device according to the first example embodiment of the present disclosure.
Figure 2C:
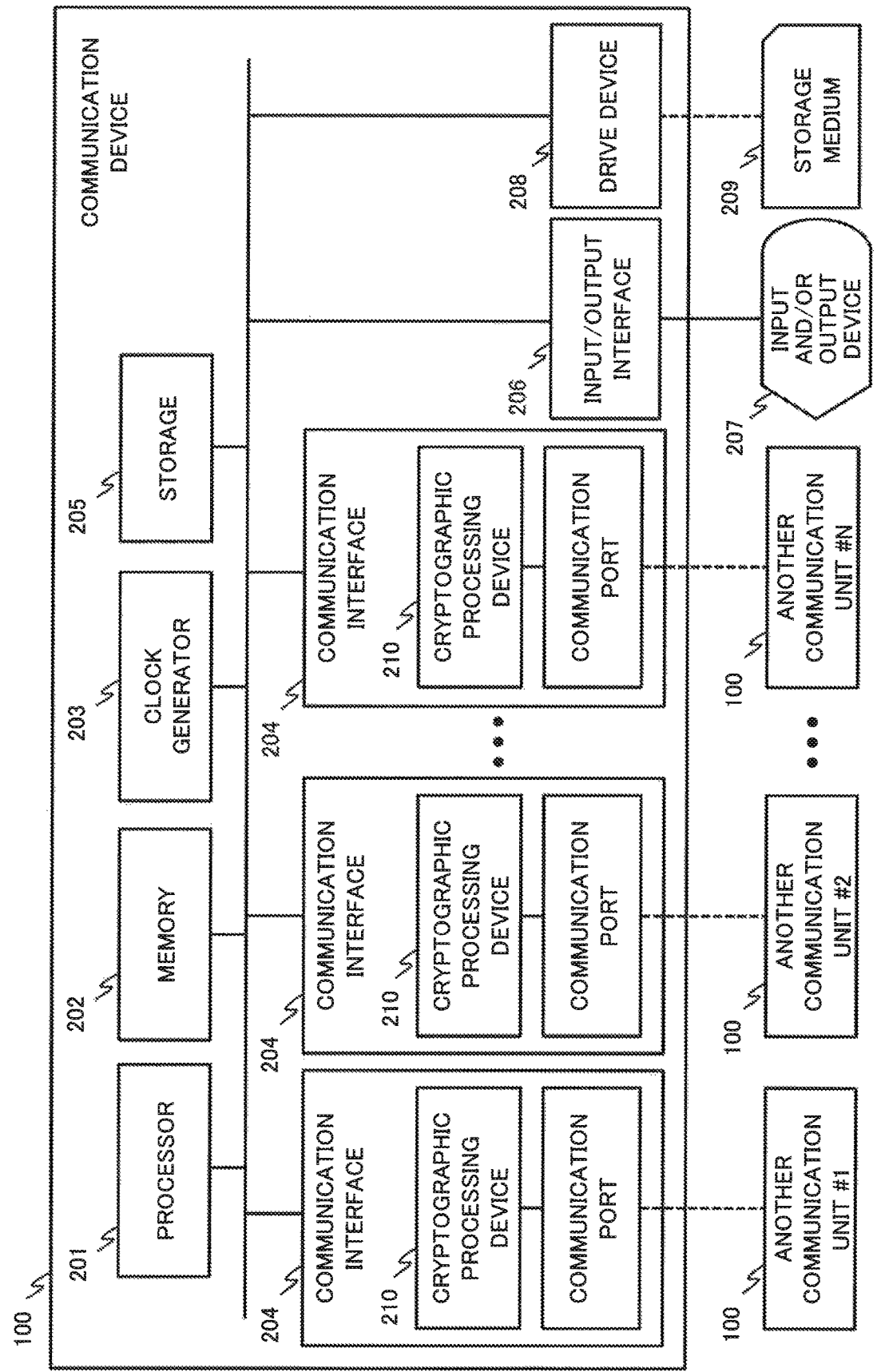
FIG. 2C is an explanatory diagram illustrating still another example of a hardware configuration capable of realizing the communication device according to the first example embodiment of the present disclosure.

A specific example of a hardware configuration capable of realizing the communication device 100 having the above-described functional configuration will be described with reference to FIG. 2A to FIG. 2C. Note that the hardware illustrated in FIG. 2A to FIG. 2C is a specific example in which the communication device 100 can be implemented, and the hardware capable of realizing the communication device 100 is not limited thereto. Further, the hardware configuration illustrated in FIG. 2A to FIG. 2C may be realized by physical hardware or may be realized by virtualized hardware. Hereinafter, the configuration exemplified in each drawing will be described.

The communication device 100 exemplified in FIG. 2A includes a processor 201, a memory 202, a clock generator 203, and a communication interface 204 including a communication port. The communication device 100 may further include a storage 205, an input and/or output interface 206, and a drive device 208. These constituent elements are mutually connected via, for example, an appropriate communication line (communication bus and the like).

Each component of the communication device 100 exemplified in FIG. 2A to FIG. 2C may be realized by, for example, a circuitry capable of providing the respective functions. Such a circuit configuration includes, for example, an integrated circuit such as system on a chip (SoC), a chip set realized by using the integrated circuit, and the like. In this case, the data stored by the components of the communication device 100 may be stored in, for example, a random access memory (RAM) area or a flash memory area integrated as a SoC, or a storage device (a semiconductor storage device or the like) connected to the SoC. Each component will be described below.

The processor 201 may be a general-purpose CPU or a microprocessor, or may be a logic circuit realized by using a programmable element. The processor 201 executes processing according to the software program read into the memory 202.

The memory 202 is, for example, a memory device such as a RAM that can be referred to from the processor 201. In the memory 202, for example, a software program capable of realizing each constituent element of the above-described communication device 100 is stored.

For example, the device information management unit 101 may be realized by the processor 201 executing a device information management program. The device information stored by the device information management unit 101 may be stored in the storage 205 to be described later, for example.

For example, the clock generation unit 102 may be realized by the processor 201 executing a clock generation program. In this case, the clock generating program generates the clock information by using data provided by the clock generator 203 to be described later. Note that a function related to the clock generation program may be incorporated in the clock generator 203.

For example, the device information selection unit 103 may be realized by the processor 201 executing a device information selection program. The device information selection program acquires data representing the clock information from the clock generation program and acquires the device information provided by the device information management program.

For example, the key generation unit 104 may be realized by the processor 201 executing a key generation program. In this case, the key generation program acquires the clock information from the clock generation program and acquires the selection information provided by the device information selection program.

For example, the cryptographic processing unit 105 may be realized by the processor 201 executing a cryptographic processing program. In this case, for example, the cryptographic processing program acquires the encryption key provided by the key generation program. Further, for example, the cryptographic processing program may acquire the encrypted communication data from the communication interface 204.

The data transfer unit 107 may be realized by the processor 201 executing a data transfer program. In this case, for example, the data transfer unit acquires the plain-text data provided by the cryptographic processing program.

Each software program executed by the processor 201 may be configured to be able to transmit various data to each other by an appropriate method, for example, such as shared memory or inter-process communication.

The clock generator 203 is, for example, a device including a device (for example, atomic clock etc.) that generates a clock signal. Further, the clock generator 203 may include a device (for example, a GPS unit, a standard radio wave receiving unit, or the like) for acquiring time information. The clock generator 203 may provide the generated clock signal or time information to other constituent elements.

The communication interface 204 is a device including a communication port connected to a communication network and a controller for controlling transmission and reception of data. When the communication device 100 is connected to a wired communication line, a communication cable may be connected to the communication interface. When the communication device 100 is connected to a wireless communication line, an antenna for communication or the like may be connected to the communication interface. The communication unit 106 in FIG. 1A and FIG. 1B may be realized by using the communication interface 204.

The storage 205 is a non-transitory storage device such as a magnetic disk drive or a semiconductor storage device based on a flash memory. The storage 205 can store various software programs, data used by the software programs, and the like.

The input and/or output interface 206 is, for example, a device that controls input and/or output with the input and/or output device 207. The input and/or output device 207 may be, for example, a device (a display, an operation button, a voice input and/or output device, or the like) that realizes an interface between the communication device 100 and the user. Note that the communication device 100 may not include the input and/or output interface 206.

The drive device 208 is, for example, a device that processes reading and writing of data to and from a storage medium 209 to be described later. Note that the communication device 100 may not include the drive device 208.

The storage medium 209 is a storage medium capable of recording data, for example, such as an optical disc, a magneto-optical disc, a semiconductor flash memory. The above software program is recorded in the storage medium 209 and may be appropriately stored in the storage 205 through the drive device 208 at the shipping stage or the operation stage of the communication device 100. In the above case, the various software programs may be installed in the communication device 100 by using an appropriate tool. In the above case, the constituent elements of the communication device 100 can be regarded as being constituted by a code constituting each of the software programs, or by a computer-readable storage medium in which such codes are recorded.

Note that, when manually setting an encryption key (for example, a pre-shared key) for each communication device, such the encryption key may be distributed to each communication device 100 by using the storage medium 209.

The communication device 100 is not limited to the above, and the communication device 100 can be realized by a configuration exemplified in FIG. 2B. FIG. 2B further includes a cryptographic processing device 210 in addition to the configuration of FIG. 2A.

The cryptographic processing device 210 is a device including a circuit configuration for executing cryptographic processing, a circuit configuration for executing key generation processing, and the like. The cryptographic processing device 210 may be realized by using, for example, a field-programmable gate array (FPGA) or an application specific integrated circuit (ASIC).

For example, in the cryptographic processing device 210, a plurality of circuits capable of executing the processing of the encryption execution unit 105*a* and the decryption execution unit 105*b* exemplified in FIG. 1B may be implemented. For each communication port of the communication interface 204, these circuits may execute cryptographic processing on communication data transmitted and received at the communication port in parallel.

Note that the cryptographic processing device 210 may be implemented, for example, in the communication interface 204 as exemplified in FIG. 2C. In this case, the cryptographic processing device 210 implemented on each communication interface 204 executes cryptographic processing on the communication data transmitted and received at the communication port included in the communication interface 204.

[Operation]

The operation of the communication device 100 configured as described above will be described.

(Generation of Encryption Key and Cryptographic Processing)

Hereinafter, in the communication device 100, execution of cryptographic processing will be described. In the following description, for convenience of explanation, it is assumed that a certain communication device 100 (referred to as "communication device X") and another communication device 100 (referred to as "communication device Y") have device information of the same content. Further, it is also assumed that each communication device 100 generates a clock signal by using an atomic clock, and clock information generated by using the clock signal is synchronized. Note that synchronization of two or more pieces of clock information means that the pieces of clock information are the same (that is, there is no difference (deviation)), or that the difference between them is within a certain criterion range. Further, it is assumed that each communication device encrypts communication data by using the common key cryptosystem.

Figure 3:
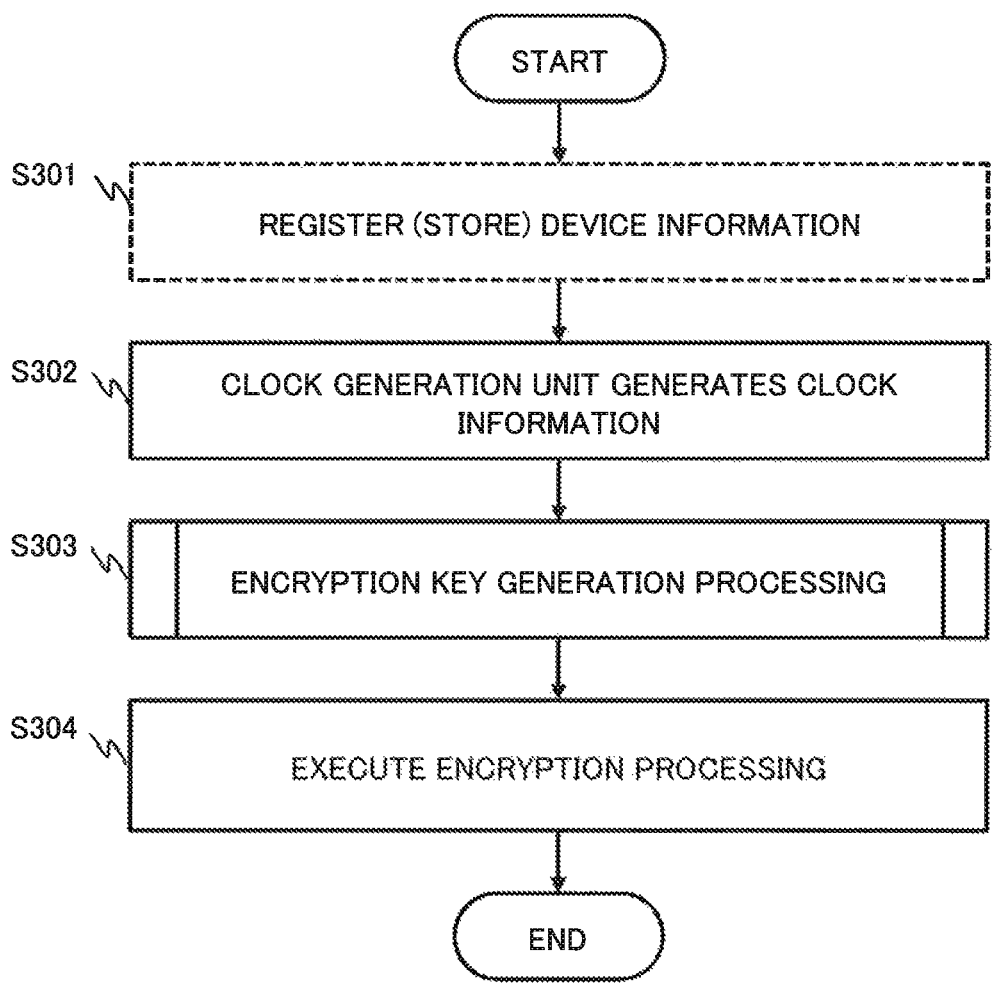
FIG. 3 is a flowchart (Part 1) for explaining an operation (cryptographic processing) of the communication device according to the first example embodiment of the present disclosure.

FIG. 3 is a flowchart illustrating an example of the operation when the communication device 100 executes encryption communication with another communication device 100.

In step S301, the device information is registered in the communication device 100. The device information management unit 101 stores the device information. For example, when the device information is set in advance in the communication device, step S301 may not be executed. It is assumed that device information of the same contents is registered in each communication device 100 (for example, communication device X and communication device Y).

The clock generation unit 102 in the communication device 100 generates clock information (step S302). As described above, the clock generation unit 102 generates a clock signal by using an atomic clock, and generates the clock information by using the clock signal. The atomic clock is capable of generating clock signals with high accuracy, and it is unlikely that errors are accumulated in a short period of time (that is, a clock shift (difference) occurs). Therefore, when the clock signal of each communication device 100 is synchronized, it is considered that each communication device 100 can generate clock information of the same contents by using the clock signal. Therefore, when a highly accurate clock signal can be generated by using an atomic clock or the like, each communication device 100 does not have to frequently adjust the difference of the clock information with another communication device 100.

The clock generation unit 102 may use information representing the counter that counts the generated clock signal as the clock information. The timing for starting the counting of the clock signal may be appropriately determined. The clock generating unit 102 is not limited to the above, and may generate clock information including information representing time.

Figure 4:
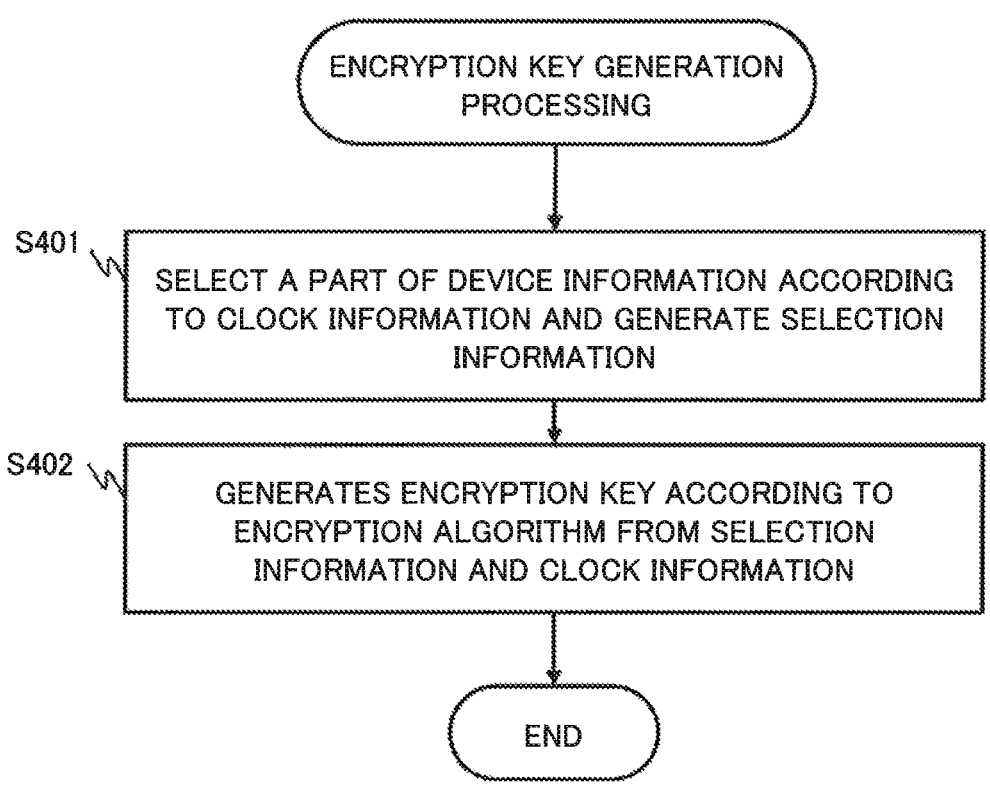
FIG. 4 is a flowchart (Part 2) for explaining an operation (encryption key generation processing) of the communication device according to the first example embodiment of the present disclosure.

The communication device 100 generates an encryption key from the device information registered in step S301 and the clock information generated in step S302 (step S303). The generation processing of the encryption key will be described below with reference to FIG. 4.

The device information selection unit 103 in the communication device 100 generates selection information from the device information registered in step S301 and the clock information generated in step S302 (step S401). The device information selection unit 103 selects at least a part of the device information stored in the device information management unit 101 according to the clock information. A specific example of the operation in which the device information selection unit 103 selects at least a part of the device information is as described above.

The device information selection unit 103 generates different selection information for each clock information by using at least a part of the selected device information. A specific example of the operation in which the device information selection unit 103 generates the selection information is as described above.

As described above, the device information selection unit 103 may convert the clock information acquired from the clock generation unit 102 to a representative value. As a result, even when a minute difference occurs in the clock information of each communication device 100, such a difference can be absorbed, and each communication device 100 (communication device X and communication device Y) can generate the same selection information.

The key generation unit 104 in the communication device 100 generates an encryption key according to the encryption algorithm used for cryptographic processing from the selection information generated in step S401 and the clock information (step S402). A specific example of the operation in which the key generation unit 104 generates the encryption key is as described above. By such processing, each communication device 100 (communication device X and communication device Y) can generate the encryption key of the same contents.

As described above, the key generation unit 104 may convert the clock information acquired from the clock generation unit 102 into a representative value. As a result, even when a minute difference occurs in the clock information of each communication device 100, it is possible to absorb such a difference.

Through the processing described above, the communication device 100 can generate various variations of encryption keys according to clock information and device information. The reason is that, by selecting a part of the device information according to the clock information, it is possible to increase the variation of the selection information used when generating the encryption key. Even when the device information stored by the device information management unit 101 is relatively few, variations of the encryption key can be increased by generating the selection information by using the clock information.

The cryptographic processing unit 105 in the communication device 100 executes cryptographic processing (step S304) by using the encryption key generated in step S303 (steps S401 to S402).

For example, the cryptographic processing unit 105 encrypts plain-text data provided from the data transfer unit 107, and provides the encrypted data to the communication unit 106. For example, the communication unit 106 in the communication device X transmits the encrypted communication data to the communication device Y.

For example, the cryptographic processing unit 105 may decrypt the encrypted communication data received by the communication unit 106 and provide the decrypted communication data to the data transfer unit 107. For example, the communication unit 106 in the communication device X provides the encrypted data received from the communication device Y to the cryptographic processing unit 105 in the communication device X. The cryptographic processing unit 105 in the communication device X decrypts the communication data and provides the decrypted communication data to the data transfer unit 107 in the communication device X.

(Update of Encryption Key)

Figure 5:
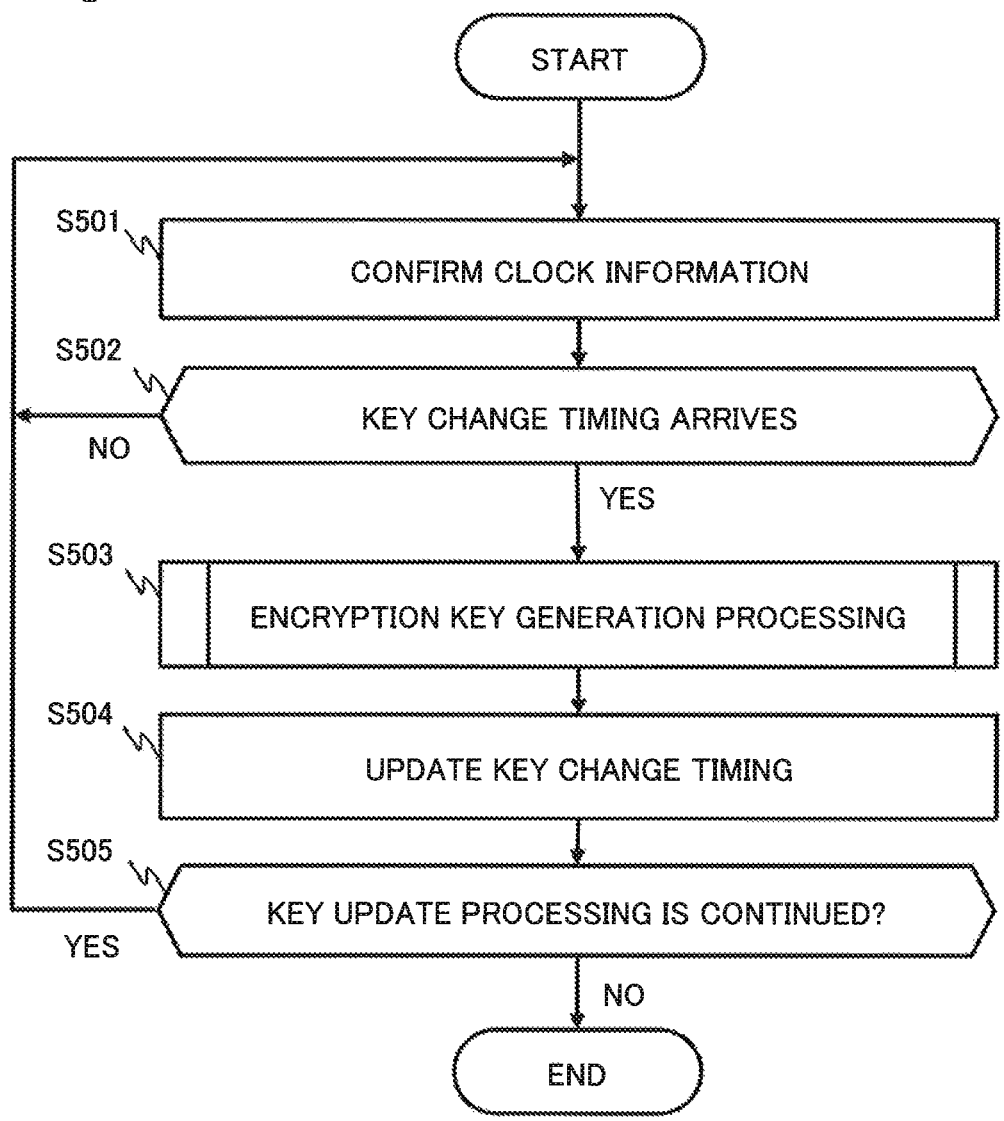
FIG. 5 is a flowchart (Part 3) for explaining an operation (update processing of encryption key) of the communication device according to the first example embodiment of the present disclosure.

Hereinafter, the change (update) of the encryption key will be described below with reference to FIG. 5. The processing (operation) of each constituent element of the communication device 100 described below is a specific example, and the constituent elements for executing certain processing (operation) can be selected appropriately. By way of example, the following processing may be performed by the device information management unit 101 giving instructions to other constituent elements.

The key generation unit 104 confirms the clock information generated by the clock generation unit 102 (step S501).

The key generation unit 104 determines whether or not the key change timing has arrived as a result of confirmation in step S501. For example, the key generation unit 104 may determine whether or not the key change timing has arrived by comparing the clock information acquired from the clock generation unit 102 with the setting value representing the timing to change the encryption key.

For example, when the clock information represents a counter value, the key generation unit 104 may determine whether or not the key change timing has arrived by comparing the counter value included in the clock information with the counter value included in the setting value.

Alternatively, for example, when the clock information represents time information, the key generation unit 104 may determine whether or not the key change timing has arrived by comparing the time included in the clock information with the time included in the setting value.

When the key change timing arrives (YES in step S502), the key generation unit 104 executes encryption key generation processing (step S503). The processing executed in step S503 may be the same as the processing in steps S401 and S402 exemplified in FIG. 4. The key generation unit 104 may provide the generated new encryption key to the cryptographic processing unit 105.

When the key change timing has not arrived (NO in step S502), the key generation unit 104 continues processing from step S501.

The key generation unit 104 updates the key change timing (step S504). For example, the key generation unit 104 sets the next timing to change the encryption key to the setting value representing the timing of changing the encryption key.

When key update processing is continued (YES in step S505), the key generation unit 104 continues processing from step S501. When the key update processing is not to be continued (NO in step S505), the key generation unit 104 ends the processing.

With the processing described above, the key generation unit 104 can change (update) the encryption key at an appropriate timing. Further, when the encryption key is changed, it is not necessary to explicitly distribute the encryption key to each communication device 100. The reason is that each communication device 100 can generate the encryption key by using the device information of the same contents and the clock information. More specifically, for example, when the clock signal generated by each communication device 100 is synchronized, each communication device 100 can generate the clock information of the same contents. Each communication device 100 can generate the same encryption key by using the device information of the same contents at the same timing (that is, same clock information). Therefore, when the encryption key is changed (updated), it is not necessary to distribute the encryption key to each communication device 100.

As described above, the communication device 100 according to the present example embodiment is capable of executing encryption communication with another communication device 100 by using the appropriate encryption key.

Note that, when the key generation unit 140 changes the encryption key, the cryptographic processing unit 105 may appropriately change the encryption key used for cryptographic processing. For example, it is assumed that a single piece of data to be transmitted from the communication device 100 on the transmission side is transmitted upon being divided into "M" ("M" is a natural number) pieces of communication data (for example, "M" packets). When the encryption key is changed at the timing of transmitting packets up to the first to the "m"-th ("m" is a natural number less than "M"), the cryptographic processing unit 105 encrypts the ("m+1")-th packet to the "M"-th packet by using the changed encryption key. As a result, a single piece of data is divided into a plurality of parts (packets), and each part is encrypted by using different encryption key. As a result, even if the encryption key used for encryption of a certain part is compromised, the entire data is not decrypted.

Since each communication device 100 generates the clock information by using, for example, a highly accurate clock signal generated by using atomic clock, the timing at which the encryption key is changed in each communication device 100 can also be synchronized with high accuracy. Therefore, each communication device 100 can encrypt a single piece of data by using a different encryption key for each part according to the timing when the encryption key is changed.

Further, the cryptographic processing unit 105 may change the encryption key during cryptographic processing for a single piece of communication data (for example, a packet). It is assumed that the encryption key is changed at the timing when the data to "m" ("m" is a natural number less than "M") bytes of the communication data of "M" ("M" is a natural number) bytes is encrypted. More specifically, it is assumed that data from 1 to "m" bytes is encrypted by the encryption key KEY(t1) generated using clock information CKLI(t1). The data from (m+1) to M bytes is encrypted by the encryption key KEY(t1+1) generated using the clock information CLKI(t1+1).

In this case, by using KEY(t1+1), the communication device 100 on the transmission side encrypts, for example, data capable of specifying parts encrypted by different encryption keys and data capable of specifying encryption keys used for encryption of the parts, and adds the encrypted data to the communication data. Hereinafter, the added data is described as "additional data". The data that can specify the parts encrypted by different encryption keys may include, for example, a combination of an offset from the head and a size (for example, an offset of "0 bytes", a size of "m bytes", and the like). The information that can specify the encryption key used for encryption of each part of the communication data may represent, for example, clock information (for example, CLKI(t1)) used to generate the encryption key.

In the communication data encrypted as described above, the clock information in the communication device 100 on the transmission side is transmitted at the timing being CLKI(t1+1). In this case, for example, the communication device 100 on the reception side receives the communication data at the timing of the clock information being CLKI(t1+1).

The communication device 100 on the reception side decrypts the additional data by using the clock information CLKI(t1+1). As a result, the communication device 100 on the reception side can specify the parts (for example, the part from first to the m-th byte, the part from the (m+1)-th to the m-th byte) encrypted by the different encryption keys among the received communication data. In addition, the communication device 100 on the reception side can generate an encryption key (for example, KEY(t1)) from data that can specify the encryption key used for encryption of each part. By the processing as described above, the communication device 100 on the reception side can decrypt each part of the communication data by using an appropriate encryption key.

Note that the timing of changing the encryption key may be appropriately adjusted according to the encryption algorithm used in the cryptographic processing unit 105. For example, when a block cipher algorithm is employed, the encryption key may be changed on a block-by-block basis. For example, when the stream encryption algorithm is adopted, the encryption key serving as the seed of the pseudo random number generator may be appropriately changed.

(Adjustment of Clock Information)

Hereinafter, an operation of adjusting a difference when there is the difference (deviation) for the clock information used for generation of the encryption keys between communication devices 100 that execute communication will be described. The processing (operation) of each constituent element of the communication device 100 described below is a specific example, and the constituent elements for executing certain processing (operation) can be selected appropriately. As one example, the following processing may be performed by the device information management unit 101 giving instructions to other constituent elements.

As described above, the encryption key is generated by using the clock information. For example, when the clock information generated in the communication device 100 (for example, communication device X) on the transmission side is different from the clock information generated in the communication device 100 (for example, communication device Y) on the reception side, there is a possibility that the encryption key used for encrypting communication data differs from the encryption key used for decryption.

Furthermore, a delay may occur in the communication path between the respective communication devices 100. As a result, there is a possibility that the encryption key is updated in the communication device 100 on the reception side until the communication data transmitted by the communication device 100 on the transmission side arrives at the communication device 100 on the reception side. In other words, there is a case in which the encryption key used for encrypting communication data is different from the encryption key used for decryption.

On the other hand, for example, it is possible for a certain communication device 100 to execute encryption communication even in the above situation by estimating the clock information of another communication device 100 and generating the encryption key by using the estimated clock information.

Note that the timing at which each communication device 100 adjusts the clock information can be selected as appropriate. That is, each communication device 100 may periodically adjust the clock information, or adjust the clock information at a predetermined timing determined by setting value or the like. Alternatively, each communication device 100 may adjust the clock information when decryption of communication data fails in the communication device 100 on the reception side.

Hereinafter, an operation of adjusting the clock information used by each communication device 100 to generate the encryption key will be described using a specific example.

As a method by which each communication device 100 (for example, communication device X and communication device Y) adjusts the difference of the clock information, a method by which at least one side of the communication devices directly transmits the clock information of own device to another communication device 100 is considerable. Hereinafter, communication data used for adjustment of clock information may be referred to as clock adjustment data.

The communication device 100 (communication device Y), which receives the clock adjustment data from another communication device 100 (communication device X), may calculate the difference between, for example, the clock information included in the clock adjustment data and the clock information of the own device at the time of receiving the clock adjustment data. The communication device Y generates the adjusted clock information by, for example, reflecting (for example, adding or subtracting) the difference to the clock information generated in the own device.

The communication device Y may generate the encryption key used for cryptographic processing on communication data transmitted and received with the communication device X by using the clock information adjusted as described above. As a result, the communication device X and the communication device Y can execute cryptographic processing using the same encryption key.

In the case of the method described above, since the clock adjustment data is transferred between the communication devices 100, there is a possibility that the clock information in the communication path leaks. Therefore, in order to prevent leakage of clock information in the communication path, it is considered that each communication device 100 encrypts, and transmits and receives the clock adjustment data. However, for example, there is a case in which the encryption key generated by using the clock information in each communication device 100 cannot be used as the encryption key for encryption of clock adjustment data. This is because, when there is a difference in clock information in each communication device 100, the encryption key generated in each communication device 100 is different.

Therefore, when all the communication devices 100 store the same device information, each communication device 100 encrypts the clock adjustment data by using the device information. For example, when each communication device 100 previously stores a common key (for example, the aforementioned pre-shared key) as the device information, each communication device 100 may encrypt the clock adjustment data by using the pre-shared key and transmit the encrypted clock adjustment data to another communication device 100.

More specifically, the cryptographic processing unit 105 encrypts the clock information by using the pre-shared key, and the communication unit 106 transmits the encrypted communication data to another communication device 100.

In this case, the pre-shared key is used for cryptographic processing on clock adjustment data. That is, the encryption key used for encryption of (normal) communication data other than clock adjustment data is generated by using clock information adjusted by clock adjustment data. In other words, the pre-shared key is not used for encryption of normal communication data.

Since the size of the data necessary for adjustment of the clock information is considered to be relatively small, the size of the clock adjustment data is considered to be relatively small. Moreover, when a high-precision clock signal is generated by using atomic clock or the like, it is considered that the frequency of occurrence of difference (deviation) of clock information between the communication devices 100 is low. Therefore, it is considered that the number of times the clock adjustment data is transmitted between the communication devices 100 is also relatively small.

Thus, since the total amount of cipher-text data encrypted by using the pre-shared key is relatively small, it is not easy to collect such cipher-text data in large amounts, which is considered to take a long time. Even when the frequency of update of the pre-shared key itself is low, the issue regarding security of encryption communication is less likely to occur.

Figure 6:
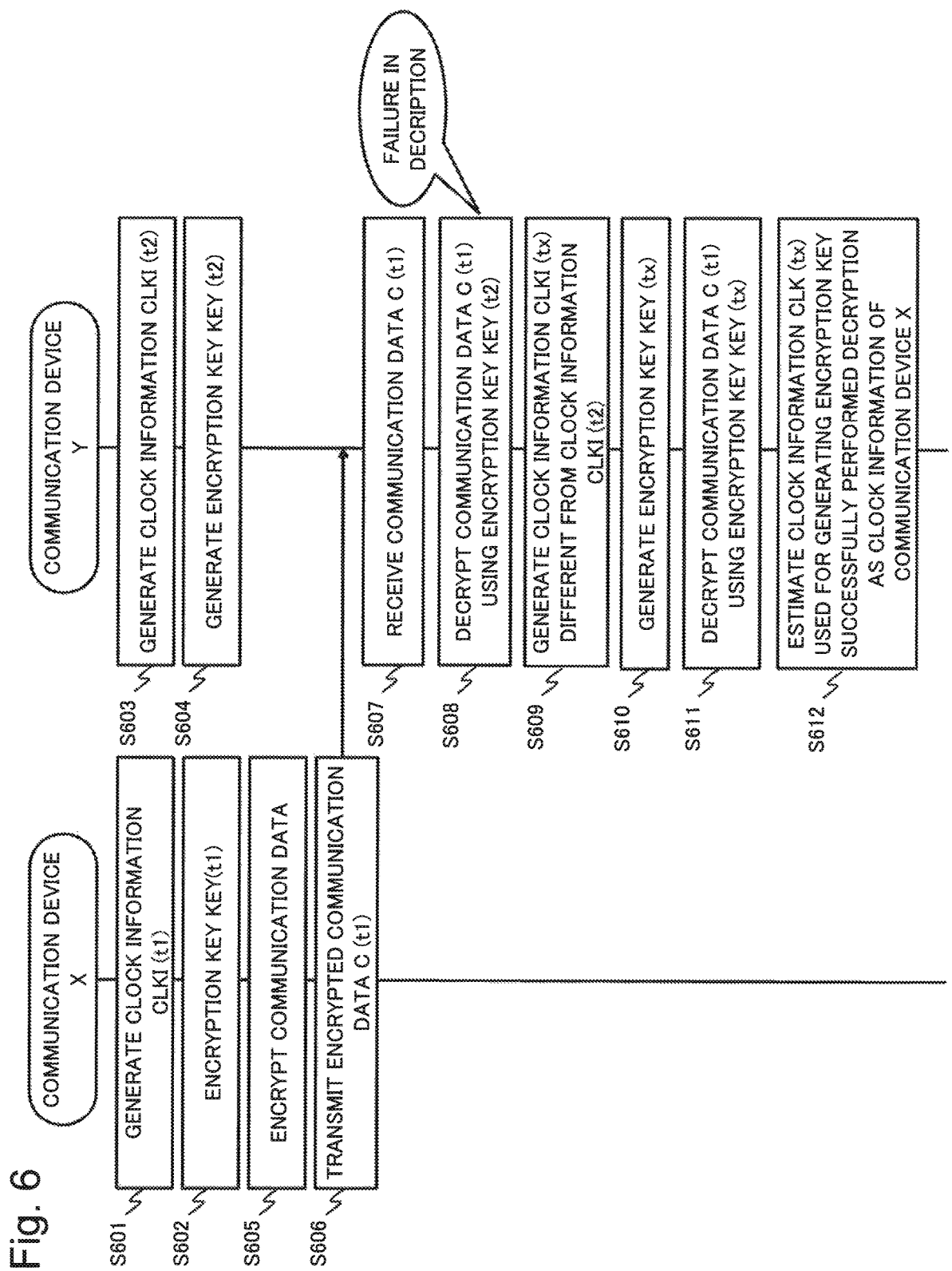
FIG. 6 is a sequence diagram (Part 1) for explaining an operation (adjustment processing of clock information) of the communication device according to the first example embodiment of the present disclosure.
Figure 7:
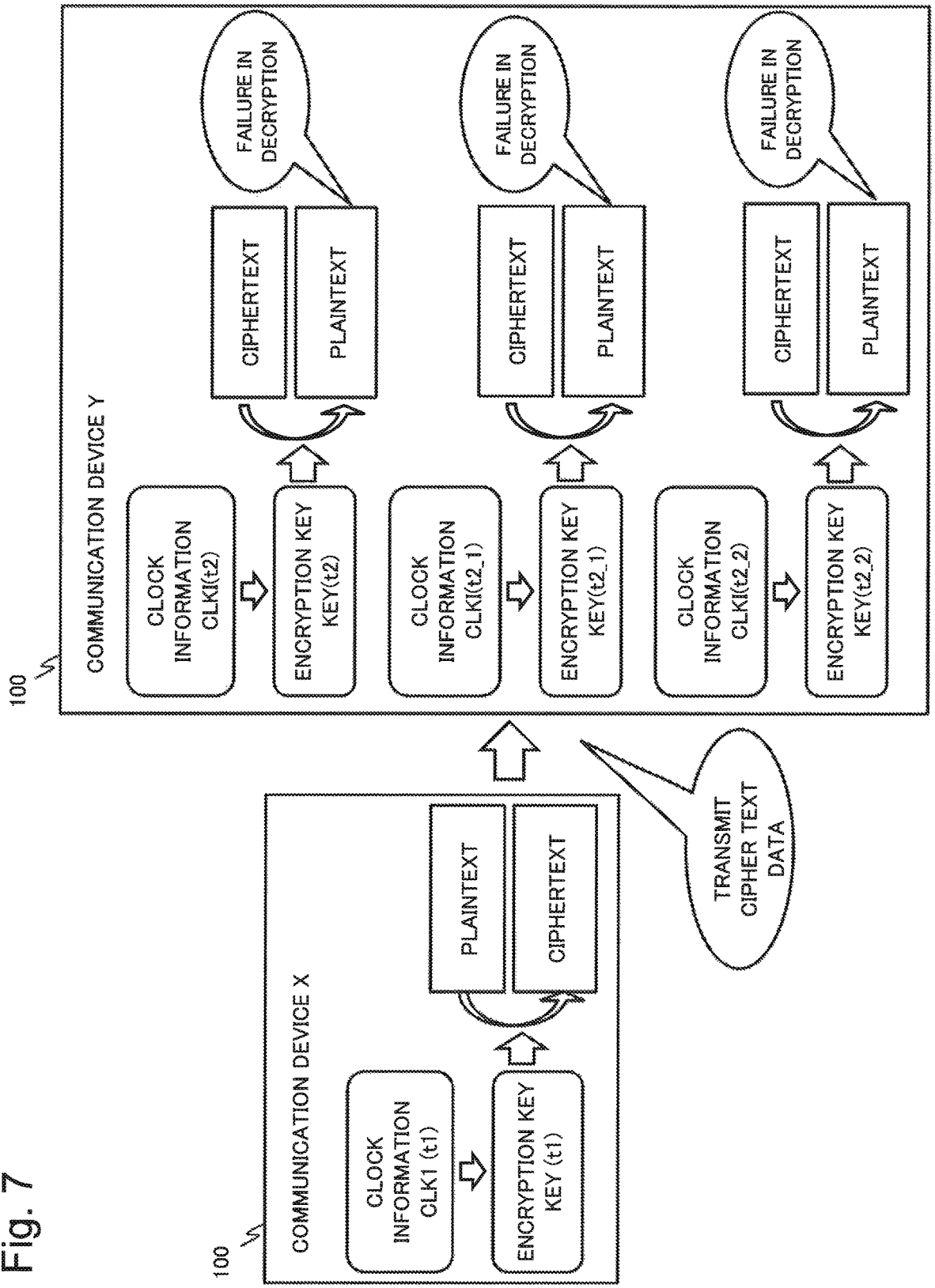
FIG. 7 is an explanatory diagram schematically explaining an operation (adjustment processing of clock information) of the communication device according to the first example embodiment of the present disclosure.

Hereinafter, another method in which each communication device 100 adjusts the clock information will be described. As another method by which each communication device 100 adjusts the clock information, a method in which the communication device 100 on the reception side predicts the clock information in the communication device 100 on the transmission side is conceivable. The method will be described below with reference to specific examples illustrated in FIGS. 6 and 7. FIG. 6 is a sequence diagram illustrating a process in which each communication device 100 synchronizes the clock information. FIG. 7 is an explanatory diagram conceptually illustrating a method of estimating the clock information of the communication device 100. Note that this example embodiment is not limited to the specific examples illustrated in FIGS. 6 and 7.

In the specific example illustrated in FIG. 6 and FIG. 7, it is assumed that at a certain timing, the communication device 100 (communication device X) on the transmission side generates clock information (CLKI(t1)) and the communication device 100 (communication device Y) on the reception side generates clock information (CLKI(t2)). That is, there is a difference between the clock information generated in each communication device 100. Hereinafter, a method in which the communication device Y on the reception side estimates the clock information generated by the communication device X on the transmission side will be described.

The communication device X generates the clock information CLKI(t1) at an appropriate timing (step S601 in FIG. 6), and generates the encryption key (hereinafter referred to as "KEY(t1)") by using the clock information CLKI(t1) (Step S602 in FIG. 6). The specific processing for generating the encryption key is as described above, and such processing may include processing for generating the selection information according to clock information CLKI(t1) (this is also applicable to the following explanation).

The communication device Y generates the clock information CLKI(t2) at an appropriate timing (step S603 in FIG. 6), and generates the encryption key (hereinafter referred to as "KEY(t2)") by using the clock information CLKI(t2) (Step S604 in FIG. 6).

The communication device X encrypts the communication data by using the encryption key KEY(t1) (step S605 in FIG. 6), and transmits the encrypted communication data (hereinafter referred to as "C(t1)") to the communication device Y (Step S606 in FIG. 6).

When generating the communication data C(t1) in step S605, the communication device X may add data (verification data) that can determine whether or not the communication data C(t1) can be properly decrypted to the communication data. For example, the communication device X may calculate a hash value of payload of the communication data before being encrypted as the verification data. The communication device X may generate the communication data C(t1) by coupling the hash value to the communication data and then encrypting all of them. Alternatively, the communication device X may add a message authentication code or a message integrity code to the communication data. The message authentication code or message integrity code can be generated by using well-known techniques.

The communication device Y receives the encrypted communication data C(t1) (step S607 in FIG. 6), and decrypts the communication data C(t1) by using the encryption key KEY(t2) (step S608 in FIG. 6). For example, the decryption processing may be executed by the cryptographic processing unit 105 in the communication device Y. At this time, the communication device Y (cryptographic processing unit 105) may determine whether or not the communication data C(t1) is correctly decrypted.

For example, when the hash value calculated from the payload of the communication data C(t1) decrypted by using the encryption key KEY(t2) is equal to the verification data added to the communication data C(t1), the communication apparatus Y may determine that the communication data C(t1) is correctly decoded. Note that, when a message authentication code is set to the communication data, the communication device Y can determine whether or not the communication data C(t1) is correctly decoded by verifying the message authentication code.

In the specific example of FIG. 6, since the encryption key KEY(t2) is an encryption key which is different from the encryption key KEY(t1), the communication device Y cannot correctly decrypt the communication data C(t1) in step S608.

In this case, for example, the communication device Y further generates a clock information CLKI(tx) which is different from the clock information CLKI(t2) (step S609 in FIG. 6). For example, the cryptographic processing unit 105 in the communication device Y may instruct generation of the clock information to the clock generation unit 102. Hereinafter, the clock information CLKI(tx) which is different from the clock information CLKI(t2) may be referred to as "first estimated clock information" in some cases. This will be described in detail with reference to FIG. 7.

For example, the communication device Y (clock generation unit 102) may generate the first estimated clock information in a specific range including the clock information CLKI(t2) (more specifically, for example, a range centered on the clock information CLKI(t2)). As described above, since the communication device X and the communication device Y generate the clock information by using the highly accurate clock signal, it is considered that the difference (difference) generated between them is relatively small. When the difference in the clock information between the communication device X and the communication device Y is small, it is considered that the clock information CLKI(t1) of the communication device X is distributed in a specific range around the clock information CLKI(t2). Note that the specific range, for example, can be appropriately acquired through an experiment in the development stage of the communication device 100 (or actual measurement in the deployment stage) and the like, and may be set in advance to the communication device 100.

In the case of the specific example illustrated in FIG. 7, for example, the communication device Y (clock generation unit 102) generates clock information CLKI(t2_1) and CLKI(t2_1) as clock information (first estimated clock information) different from the clock information CLKI(t2). For example, the clock information CLKI(t2_1) and CLKI(t2_2) may be included in the range of the specific clock information including the clock information CLKI(t2).

For example, it is assumed that the clock information CLKI(t2) represents a counter value "N" (e.g., N is a positive integer). In this case, for example, the communication device Y may generate clock information included in a specific range including a counter value "N" (for example, from a counter value "N−n" to a counter value "N+n", where "n" is a positive integer). In the specific example illustrated in FIG. 7, the communication device Y generates clock information CLKI(t2_1) representing the counter value "N−1" and clock information CLKI(t2_2) representing the counter value "N+1".

For example, it is assumed that the clock information CLKI(t2) represents the time "t". In this case, for example, the communication device Y may generate clock information included in a specific range including the time "t" (for example, from a time before "Δt" ("Δt": positive integer) from the time "t", to a time after "Δt" from the time "t", or the like). In the specific example illustrated in FIG. 7, the communication device Y generates clock information CLKI (t2_1) representing the time "t−1" and clock information CLKI(t2_2) representing the time "t+1". The unit of time may be selected appropriately (for example, milliseconds, seconds, minutes, or the like).

The communication device Y (device information selection unit 103) generates the selection information by using the first estimated clock information generated as described above. The communication device Y (key generation unit 104) generates the respective encryption key (for example, the encryption key KEY(t2_1) and the encryption key KEY(t2_2)) by using the generated selection information and the first estimated clock information (Step S610 in FIG. 6). Hereinafter, the encryption key generated by using the first estimated clock information may be described as "first estimated encryption key" in some cases.

The communication device Y (cryptographic processing unit 105) decrypts the communication data C(t1) by using the generated encryption key (first estimated encryption key) (step S611 in FIG. 6). The method of determining whether or not the decryption of the communication data C(t1) is successful is as described above.

When the communication data C(t1) can be decrypted, the communication device Y (cryptographic processing unit 105) estimates the clock information used for generating the encryption key successfully decrypted as the clock information of the communication device X (Step S612 of FIG. 6). In the case of the specific example illustrated in FIG. 7, it is possible to correctly decrypt the communication data C(t1) by using the encryption key KEY(t2_2). The clock information used to generate encryption key KEY(t2_2) is clock information CLKI(t2_2). In this case, the communication device Y estimates that the clock information of the communication device X is CLKI(t2_2).

Note that the communication device Y generates clock information (for example, the above CLKI(t2_1) and CLKI (t2_2)) included in the range of the specific clock information one by one, and may confirm whether the communication data C(t1) can be decrypted by the encryption key generated by using the clock information.

According to the above method, the communication device 100 can estimate clock information in another communication device 100 without transmitting and receiving clock adjustment data.

The key generation unit 104 in the communication device Y may store (memorize), for example, the difference between the clock information CLKI(t2) and the clock information CLKI(t2_2) as the difference between the clock information of the communication device X and the clock information of the communication device Y. When generating the encryption key used for the encryption communication with the communication device X, the key generation unit 104 in the communication device Y may adjust the clock information acquired from the clock generation unit 102 by using the difference, and generate the encryption key by using the adjusted clock information.

Hereinafter, yet another method will be described in which each communication device 100 adjusts clock information. As another method by which each communication device 100 adjusts clock information, a method in which the communication device 100 on the transmission side predicts the clock information in the communication device 100 on the reception side is conceivable. For example, when the communication device 100 on the transmission side receives, from the communication device 100 on the reception side, a notification representing that the communication data transmitted from the own device cannot be correctly decrypted, the communication device 100 on the transmission side may predict the clock information in the communication device 100 on the reception side.

Figure 8:
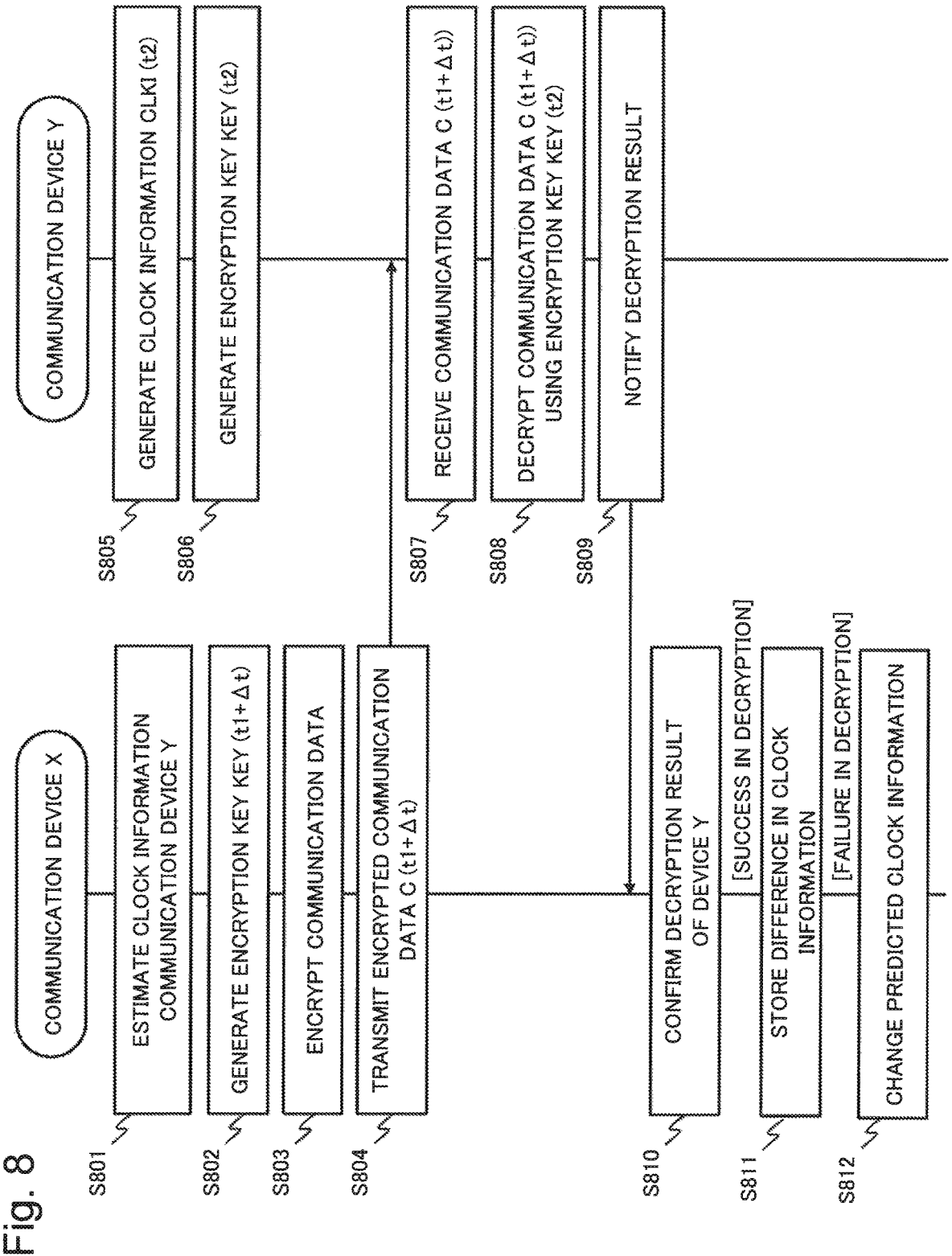
FIG. 8 is a sequence diagram (Part 2) for explaining an operation (adjustment processing of clock information) of the communication device according to the first example embodiment of the present disclosure.

The method will be described below with reference to a sequence diagram exemplified in FIG. 8. In the following description, the clock information generated by the communication device X is described as CLKI(t1), and the clock information of the communication device Y predicted by the communication device X is described as CLKI(t1+Δt). Further, the clock information of the communication device Y predicted by the communication device X may be referred to as second estimated clock information.

BY considering the delay in the communication path, the time elapsed since adjusting the clock information at the previous time, and the like, the communication device 100 (communication device X) on the transmission side estimates the clock information (second estimated clock information) in the communication device 100 (communication device Y) on the reception side (step S801). Note that, as a method of measuring the delay in the communication path, well-known techniques can be adopted.

For example, the communication device X may predict the second estimated clock information in the range of the specific clock information including the clock information CLKI(t1) generated in the own device. For example, the key generation unit 104 in communication device X may instruct the clock generation unit 102 to generate the second estimated clock information.

The communication device X (device information selection unit 103) generates the selection information by using the clock information CLKI(t1+Δt). Then, the communication device X (key generation unit 104) generates the encryption key (KEY(t1+Δt)) from the clock information CLKI(t1+Δt) and the generated selection information (step S802). Hereinafter, such encryption key may be referred to as "second estimated encryption key" in some cases. The communication device X (cryptographic processing unit 105) encrypts the communication data by using the generated encryption key (second estimated encryption key) (step S803).

The communication device X (communication unit 106) transmits the encrypted communication data C(t1+Δt) to the communication device Y (step S804).

In the communication device Y, the clock information CLKI(t2) is generated at an appropriate timing (step S805), and the encryption key KEY(t2) is generated by using the clock information CLKI(t2) (step S806).

The communication device Y receives the communication data C(t1+Δt)) from the communication device X (step S807) and decrypts the communication data C(t1+Δt)) by using the encryption key KEY(t2) (step S808).

The communication device Y notifies the communication device X of whether or not the communication data C(t1+Δt) can be correctly decrypted in step S808 (step S809).

The communication device X confirms the notification received from the communication device Y (step S810). When the communication device Y can correctly decrypt the communication data C(t1+Δt), the communication device X estimates that the clock of the communication device Y is (t1+Δt). In this case, the communication device X may store (memorize) the difference (Δt) in clock information between the own device and the communication device Y.

When executing encryption communication with the communication device Y, the communication device X can adjust the clock information by reflecting the difference in the clock information generated by the own device. The communication device X can execute the encryption communication with the communication device Y by generating the encryption key by using the adjusted clock information.

When the communication device Y fails to decrypt the communication data C(t1+Δt), the communication device X changes the clock information predicted with respect to the communication device Y (e.g., changes to CLKI(t1+Δt2) (step S812). For example, the communication device X may repeatedly execute the steps S801 to S812 until the decryption processing in the communication device Y succeeds.

In the above, a specific example of a method in which each communication device 100 adjusts the clock information with another communication device 100 has been described.

Figure 9:
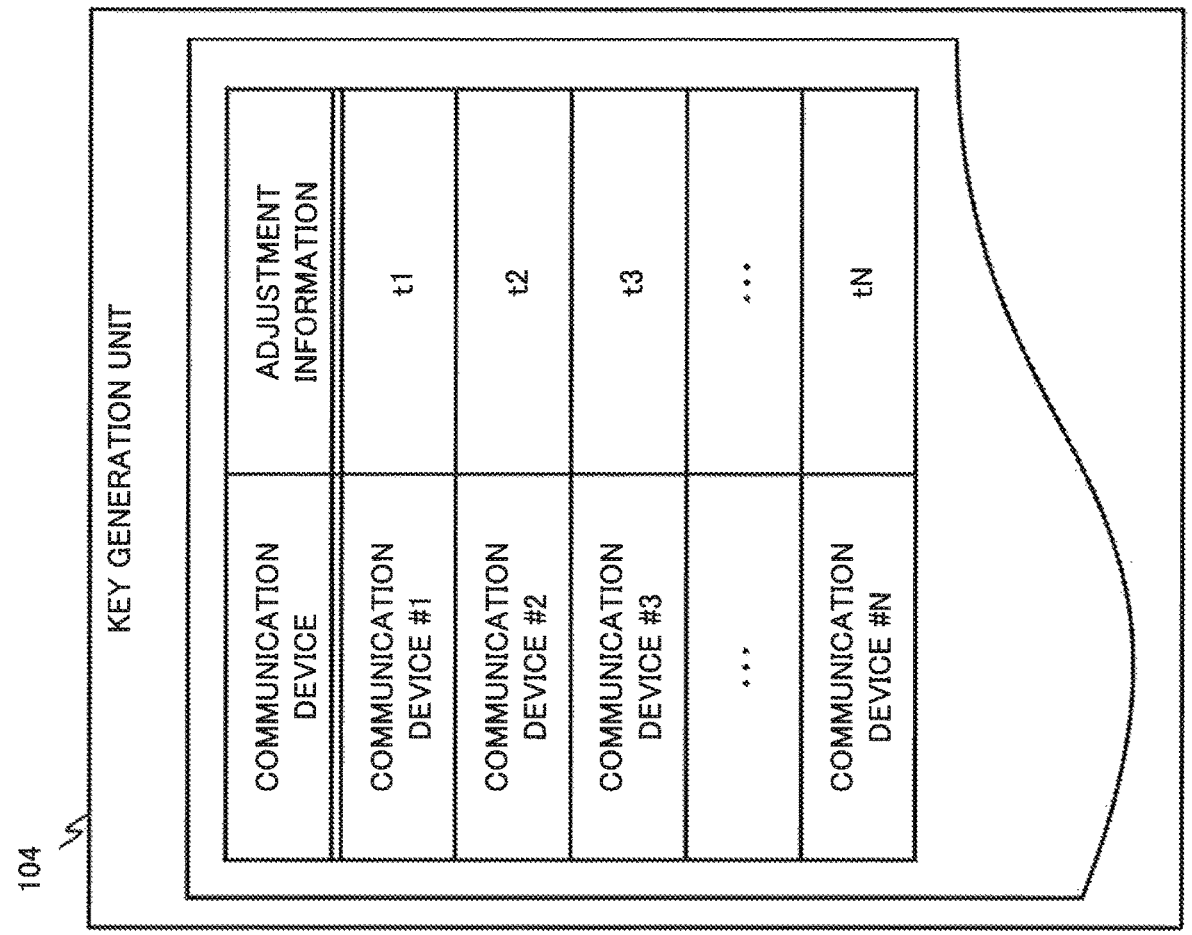
FIG. 9 is an explanatory diagram schematically illustrating a specific example relating to adjustment information for the clock information stored by the communication device according to the first example embodiment of the present disclosure.

When each communication device 100 communicates with a plurality of another communication devices 100, the key generation unit 104 in the each communication device 100 may store adjustment information used for adjustment of the clock information in association with another communication device 100 (for example, FIG. 9). Such adjustment information may typically represent a difference between the clock information generated in a certain communication device 100 and the clock information generated in another communication device 100.

(Adjustment of Encryption Key)

Figure 10:
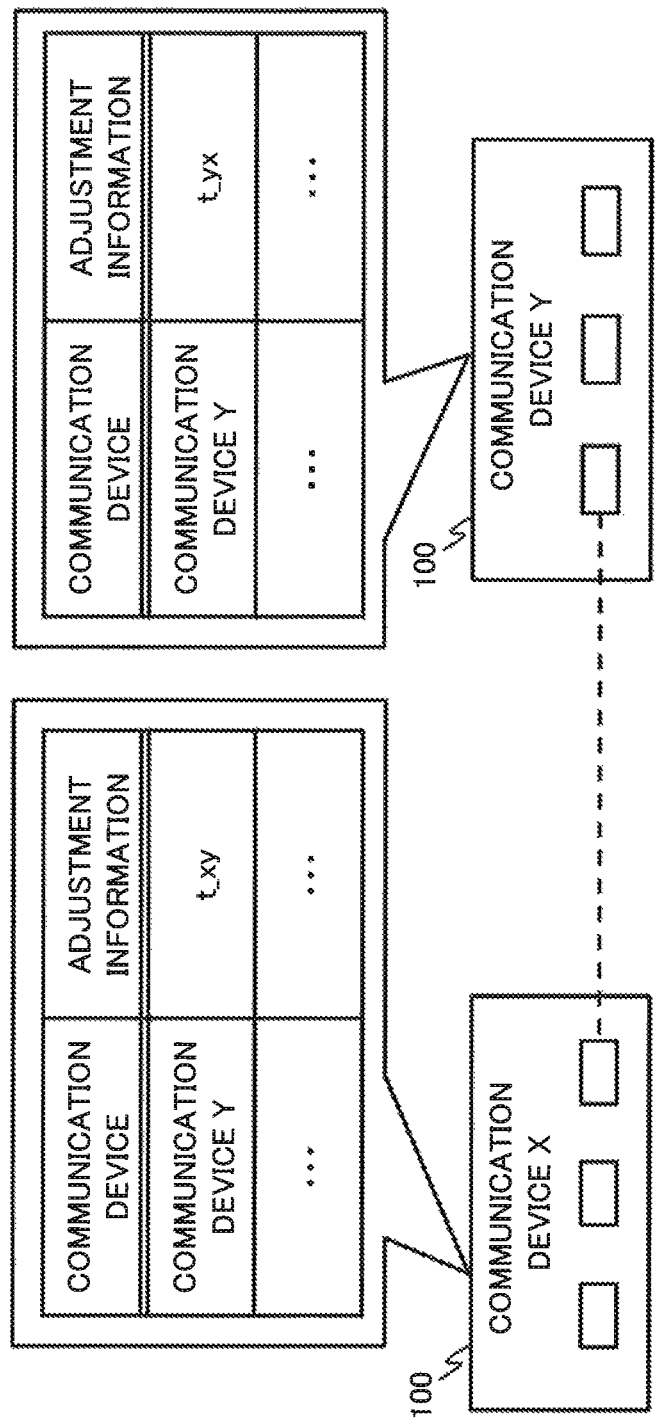
FIG. 10 is an explanatory diagram schematically illustrating a specific example relating to adjustment of an encryption key by a communication device according to the first example embodiment of the present disclosure.

Hereinafter, a method in which an encryption key used between the communication device 100 (communication device X) on the transmission side and the communication device 100 (communication device Y) on the reception side is adjusted by using the clock signal adjusted as described above will be explained with reference to the specific example illustrated in FIG. 10. Note that the specific example illustrated in FIG. 10 is an example for explanation, and the present example embodiment is not limited thereto. The processing (operation) of each constituent element of the communication device 100 described below is a specific example, and constituent elements for executing certain processing (operation) can be selected appropriately.

When adjustment processing of the clock information described above is executed, as illustrated in FIG. 10, each communication device 100 stores the adjustment information for the clock information related to another communication device 100. That is, the communication device X stores the adjustment information for the clock information related to the communication device Y, and the communication device Y stores the adjustment information for the clock information related to the communication device X.

In this case, any one of the communication devices 100 on the transmission side of the communication data and the communication device 100 on the reception side of the communication data generates the encryption key by using the adjusted clock information, and executes cryptographic processing by using the encryption key.

Whether the encryption key is generated by using the clock information adjusted by which of the communication device 100 on the transmission side of the communication data and the communication device 100 on the reception side of the communication data may be determined in advance, or may be selected when each communication device 100 communicates with another communication device 100.

Hereinafter, a case where the communication device 100 to be the transmission side of the communication data adjusts the clock information will be described.

When transmitting the communication data from the communication device X to the communication device Y, the communication device X (in particular, the device information selection unit 103 and the key generation unit 104) adjusts the clock information generated in the communication device X, by using the adjustment information (t_xy) for the communication device Y. More specifically, the communication device X may adjust the clock information by adding (or subtracting) the adjustment information to the clock information generated in the communication device X. The communication device X generates the encryption key according to the above-described method by using the adjusted clock information, and encrypts the communication data by using the encryption key. On the other hand, in this case, the communication device Y on the reception side generates the encryption key without adjusting the clock information. The communication device Y can decrypt the encrypted data received from the communication device X by using the encryption key.

Similarly, when transmitting the communication data from the communication device Y to the communication device X, the communication device Y adjusts the clock information generated in the communication device Y, by using the adjustment information (t_yx) for the communication device X. The communication device Y generates the encryption key according to the above-described method by using the adjusted clock information, and encrypts the communication data by using the encryption key. On the other hand, in this case, the communication device X on the reception side generates the encryption key without adjusting the clock information. The communication device X can decrypt the encrypted data received from the communication device Y by using the encryption key.

According to the operation described above, the communication device 100 on the transmission side adjusts the clock information so that the communication device 100 on the reception side can execute the encryption communication without adjusting the clock information.

Hereinafter, a case where the communication device 100 to be the reception side of the communication data adjusts the clock information will be described.

For example, when transmitting the communication data from the communication device X to the communication device Y, the communication device X generates the encryption key by the above-described method without adjusting the clock information generated in the communication device X, and encrypts the communication data by using the encryption key. On the other hand, in this case, the communication device Y on the reception side adjusts the clock information generated in the communication device Y, by using the adjustment information (t_yx) for the communication device X. The communication device Y can decrypt the encrypted data received from the communication device X by using the encryption key.

For example, when transmitting the communication data from the communication device Y to the communication device X, the communication device Y generates the encryption key by the above-described method without adjusting the clock information generated in the communication device Y, and encrypts the communication data by using the encryption key. On the other hand, in this case, the communication device X on the reception side adjusts the clock information generated in the communication device X, by using the adjustment information (t_xy) for the communication device Y. The communication device X can decrypt the encrypted data received from the communication device Y by using the encryption key.

By the above-described operation, the communication device 100 on the transmission side does not adjust the clock information, and the communication device 100 on the reception side adjusts the clock information so that the encryption communication can be executed.

The operation of the communication device 100 has been described above. The communication device 100 configured as described above can execute encryption communication with another communication device 100 by using the appropriate encryption key. The reason is as follows.

That is, each communication device 100 generates the encryption key by using at least a part of the device information stored by each communication device 100 and the clock information. If each communication device 100 stores the same contents of the device information and the clock information generated in each communication device is synchronized, each communication device 100 can generate the same encryption key. That is, it is not necessary to explicitly distribute the encryption key to each communication device 100.

Since each communication device 100 generates the encryption key by using at least a part of the device information and the clock information, there is no need to share a predetermined encryption key. Furthermore, for example, variations of the generated encryption key are not limited to variations of known encryption key.

Since each communication device 100 generates the clock information by using a highly accurate clock signal generated by using, for example, an atomic clock, the clock information of each communication device 100 can be synchronized with high accuracy. Therefore, for example, each communication device 100 can appropriately change the encryption key at the same timing according to such clock information. Further, when changing the encryption key, it is not necessary to explicitly distribute the changed encryption key.

When a difference in clock information occurs, each communication device 100 can execute processing for adjusting the difference as described above. Even when a difference in clock information occurs, each communication device 100 can generate the encryption key that can be used for encryption communication with another communication device 100 by adjusting the difference. Further, the communication device 100 on the transmission side or the communication device 100 on the reception side generates the encryption key by using the appropriately adjusted clock information, whereby encryption communication with another communication device 100 can be executed.

[First Modification]

Hereinafter, a first modification of the communication device 100 according to the present example embodiment will be described. The functional configuration that can realize the communication device 100 in this modification may be the same as the first example embodiment.

In this modification, the operations of the device information management unit 101 and the cryptographic processing unit 105 are different from those of the first example embodiment described above. Hereinafter, such differences will be described using concrete examples illustrated in FIG. 11A and FIG. 11B.

Figure 11A:
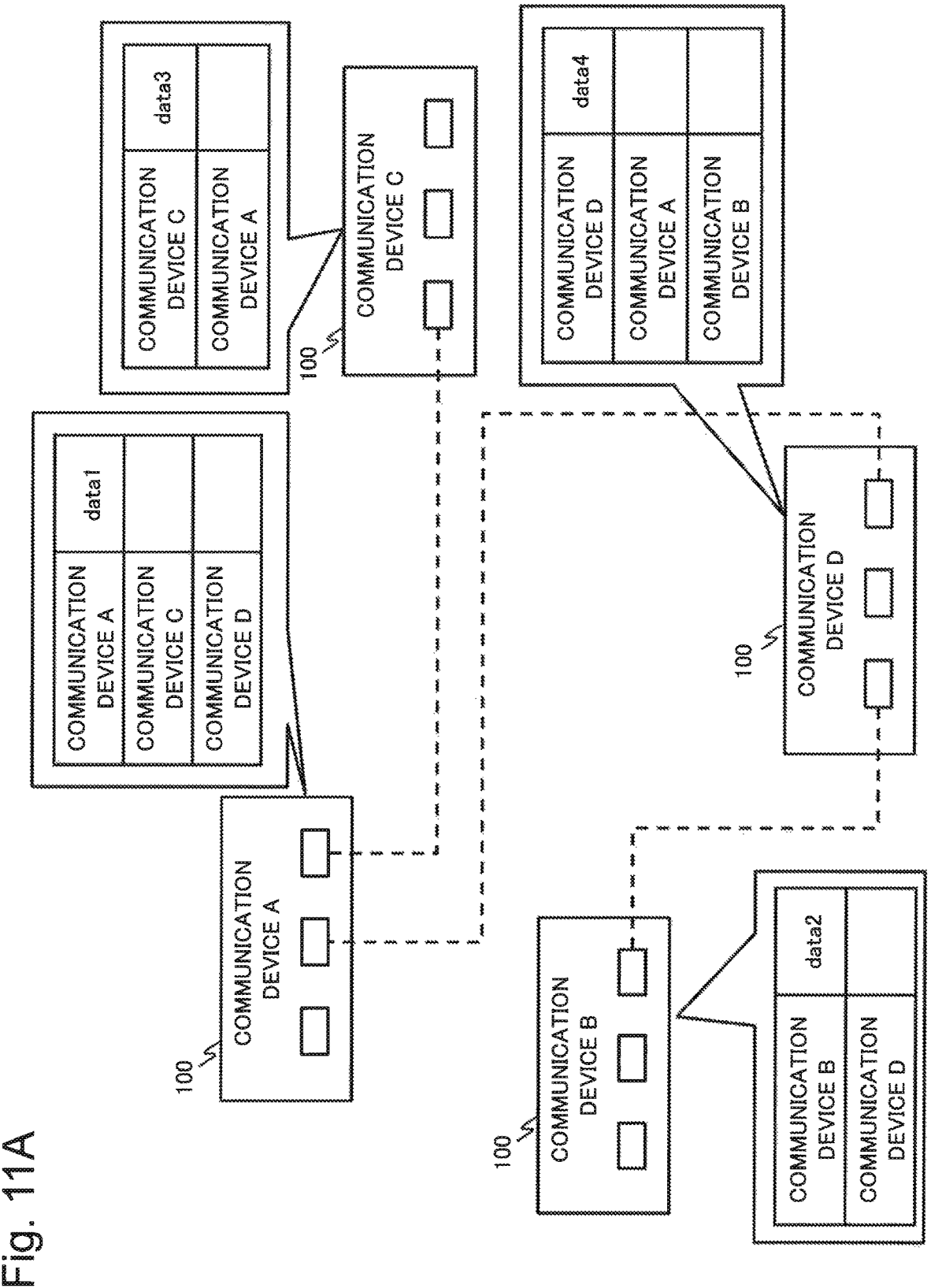
FIG. 11A is an explanatory diagram (Part 1) schematically illustrating a specific example relating to delivery of device information by the communication device according to the first example embodiment of the present disclosure.

In the case of the specific example illustrated in FIG. 11A, the device information management unit 101 in the each communication device 100 (communication device A to communication device D) respectively stores data (data 1, data 2, data 3, and data 4) unique to the communication device 100. In addition, the device information management unit 101 in each communication device 100 stores at least one piece of the device information common to each apparatus. The device information common to each apparatus may be, for example, a pre-shared key described above. As described above, the pre-shared key is an encryption key common to each communication device.

For example, the device information management unit 101 in each communication device 100 mutually transmits and receives unique device information stored by each of them at the timing of starting communication with another communication device 100. At this time, each communication device 100 encrypts the communication data including unique device information by using, for example, the pre-shared key.

More specifically, the cryptographic processing unit 105 encrypts the communication data including the device information unique to each communication device 100 stored by the device information management unit 101, by using the pre-shared key. The communication unit 106 transmits the encrypted communication data to another communication device 100.

When the communication unit 106 receives the communication data including the unique device information from another communication device 100, the cryptographic processing unit 105 decrypts the communication data by using the pre-shared key. The cryptographic processing unit 105 may provide the device information management unit 101 with the device information which is unique to another communication device 100 and is included in the decrypted communication data.

Figure 11B:
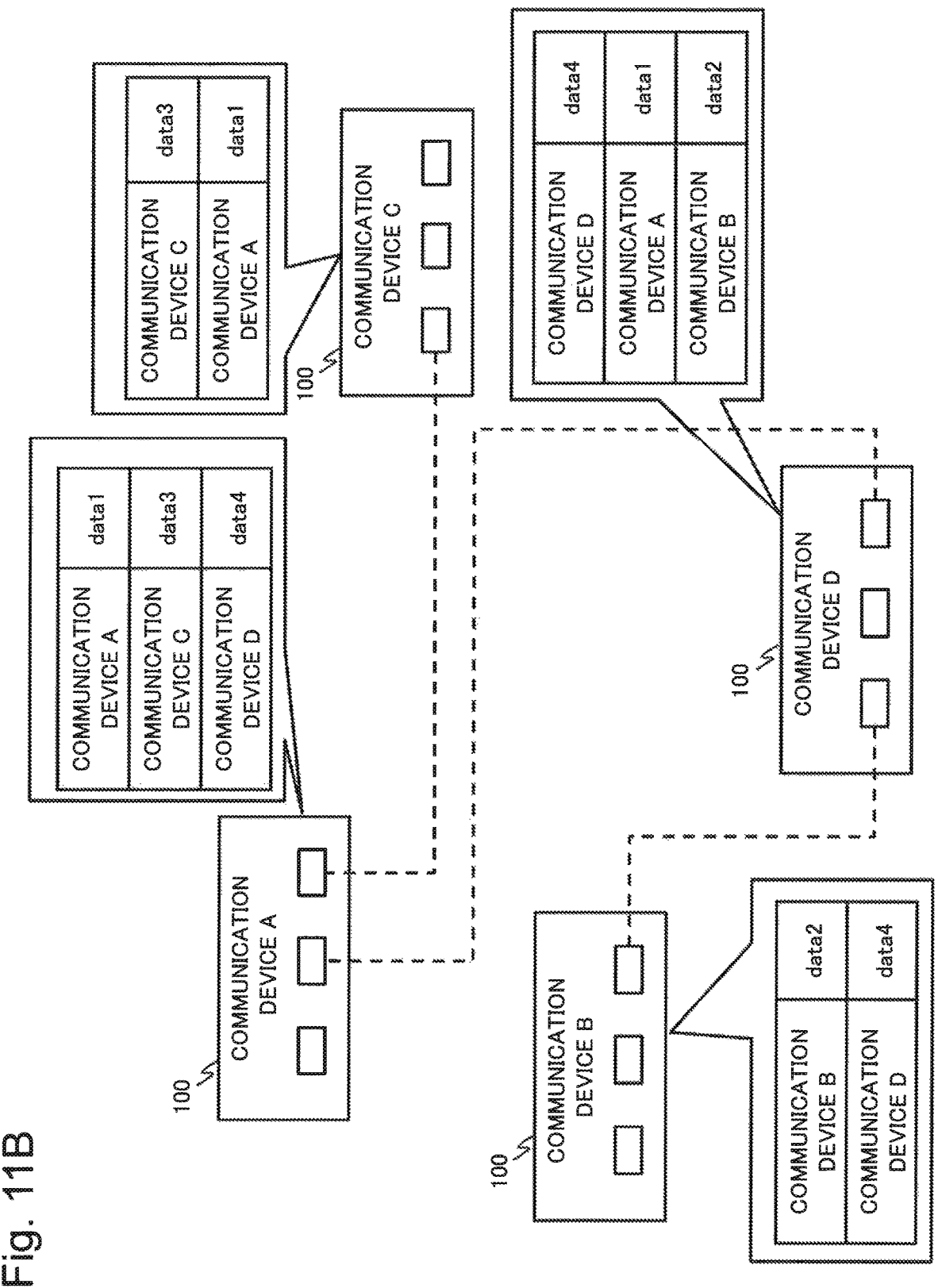
FIG. 11B is an explanatory diagram (Part 2) schematically illustrating a specific example relating to delivery of device information by the communication device according to the first example embodiment of the present disclosure.

As a result of the processing, as illustrated in FIG. 11B, each communication device 100 can store the device information of the same contents for the other communication devices 100. For example, the communication device A and the communication device C store data 1 and data 3 as the device information, respectively. The communication device A and the communication device D store data 1 and data 4 as the device information, respectively. The communication device B and the communication device D store data 2 and data 4 as the device information, respectively.

In the subsequent communication, for example, the device information selection units 103 in the communication device A and the communication device C generate the selection information by using the clock information and the device information (data 1 and data 3). The device information selection units 103 in the communication device A and the communication device D generate the selection information by using the clock information and the device information (data 1 and data 4). The device information selection units 103 in the communication device B and the communication device D generate the selection information by using the clock information and the device information (data 2 and data 4). The key generation unit 104 in each communication device 100 generates the encryption key by using the selection information generated as described above and the clock information.

Through the above processing, when communicating with another communication device 100, each communication device 100 can use a different encryption key for another communication device 100 respectively. In the specific example illustrated in FIG. 11A, and FIG. 11B, the communication device A can use different encryption keys for the encryption communication with the communication device C and the encryption communication with the communication device D. The communication device D can use different encryption keys for the encryption communication with the communication device A and the encryption communication with the communication device B.

From this, according to this modification, even if the encryption key between certain communication devices (for example, communication device A and communication device C) is compromised, the influence on the safety in the encryption communication between other communication devices (for example, communication device A and communication device D) can be alleviated.

Note that the pre-shared key is used for encryption of the device information transmitted and received by each communication device 100 and is not used for encryption of ordinary communication data. That is, since the total amount of cipher-text data encrypted by using the pre-shared key is relatively small, it is considered that it is not easy to collect such cipher-text data in large amount. Therefore, attack against pre-shared key is considered to be relatively difficult.

[Second Modification]

Hereinafter, first modification of the communication device 100 according to the present example embodiment will be described. The functional configuration that can realize the communication device 100 in this modification may be the same as the first example embodiment.

This modification is different from the first example embodiment explained above in the operation of the device information selection unit 103. The differences will be described below.

Figure 12:
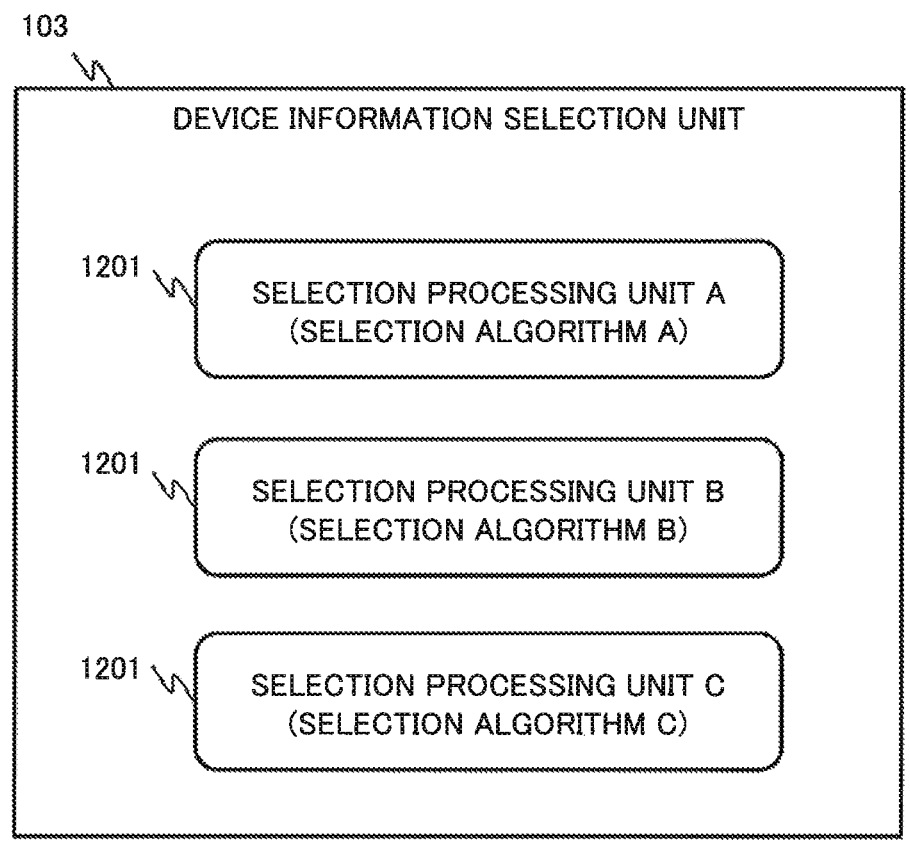
FIG. 12 is an explanatory diagram illustrating a configuration example of a device information selection unit constituting the communication device according to the first example embodiment of the present disclosure.

A configuration example of the device information selection unit 103 according to this modification is illustrated in FIG. 12. The device information selection unit 103 according to this modification has a plurality of selection processing units 1201 that respectively selects at least a part of the device information according to different selection algorithms. The device information selection unit 103 according to this modification selects at least one selection processing unit 1201 from a plurality of selection processing units 1201 in accordance with the clock information, and generates the selection information by using at least a part of the device information selected by the selection processing unit 1201.

In the case of the configuration illustrated in FIG. 12, the device information selection unit 103 has, for example, a selection processing unit A, a selection processing unit B, and a selection processing unit C. Note that the number of selection processing units 1201 is not particularly limited, and may be appropriately determined. Each selection processing unit 1201 (selection processing unit A to selection processing unit C) respectively selects a part of the device information according to a different selection algorithm.

In the case of the configuration illustrated in FIG. 12, for example, the selection processing unit A selects some pieces of the device information from a plurality of pieces of the device information stored in the device information management unit 101 according to the clock information. For example, the selection processing unit B divides one or more pieces of the device information into a plurality of parts, and selects and combines the divided parts appropriately according to the clock information. For example, the selection processing unit C appropriately rearranges a plurality of pieces of the device information stored in the device information management unit 101 according to the clock information.

The device information selection unit 103 may provide the device information (or a part thereof) selected by each of the selection processing units 1201 (selection processing unit A to selection processing unit C) as selection information as it is. For example, the device information selection unit 103 may provide, as selection information, a result of executing a predetermined operation (for example, a hash function or the like) on the device information (or a part thereof) selected by each of the selection processing units 1201.

Figure 13:
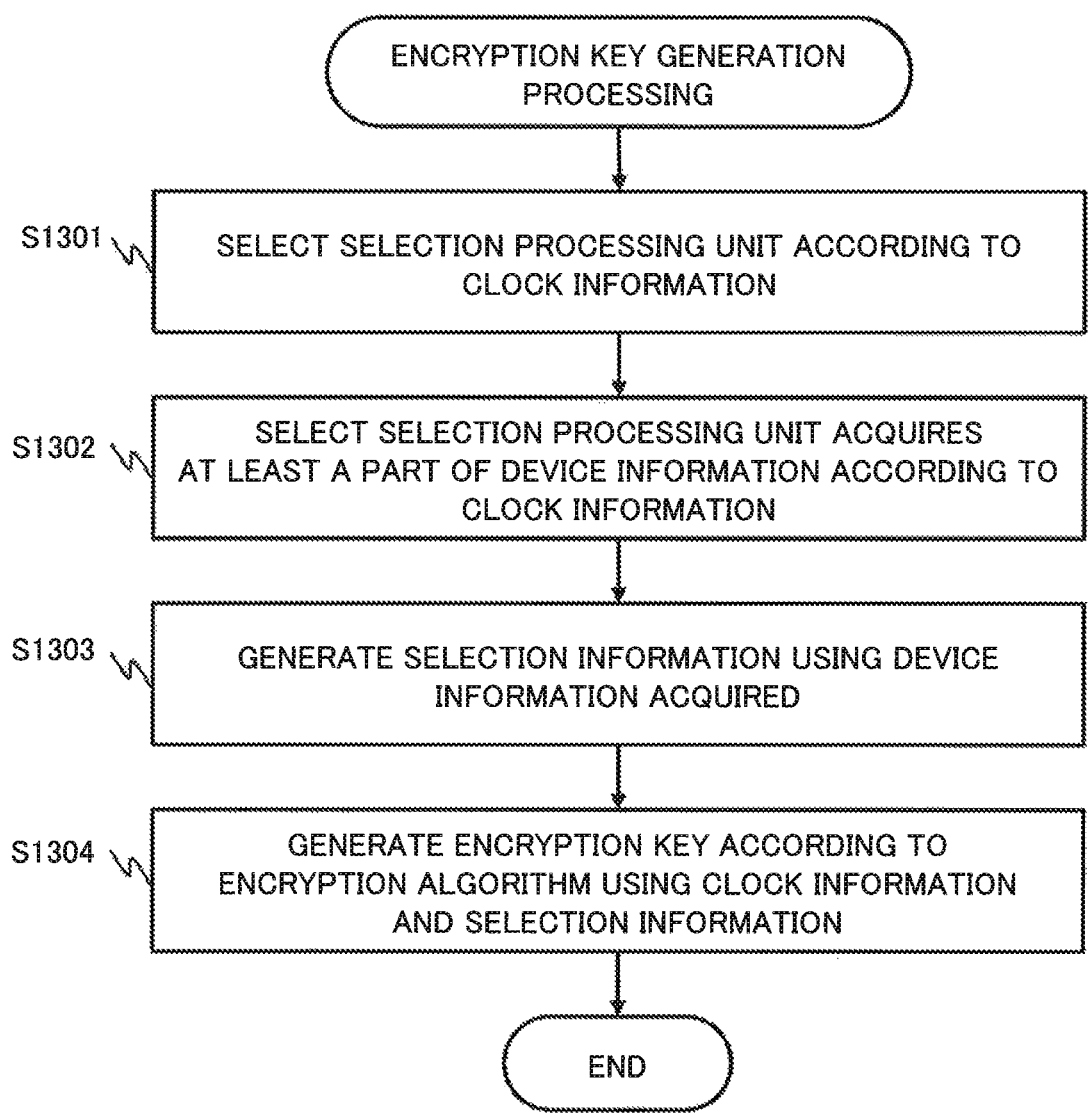
FIG. 13 is a flowchart illustrating an operation of the communication device (generation processing of selection information and an encryption key) according to the first example embodiment of the present disclosure.

Generating process of the encryption key according to this modification will be explained with reference to a flowchart exemplified in FIG. 13.

The device information selection unit 103 selects the selection processing unit 1201 according to the clock information (step S1301). The method of selecting the selection processing unit 1201 may be determined as appropriate. The device information selection unit 103 may sequentially select the selection processing unit 1201 according to the clock information. The device information selection unit 103 may randomly select the selection processing unit 1201 by generating a random number with the clock information as a seed.

The selection processing unit 1201 selected in step S1301 acquires at least a part of the device information according to the clock information (step S1302).

The device information selection unit 103 generates the selection information by using the device information acquired in step S1302 (step S1303).

The key generation unit 104 generates the encryption key according to the encryption algorithm by using the generated selection information and the clock information (step S1304). The processing in step S1304 may be the same as the processing in step S402.

According to this modification constructed as described above, the selection information is generated by using different selection algorithms according to the clock information. That is, it is possible to increase the variation of the method of generating the selection information. This makes it difficult to predict the original data used to generate the encryption key.

Second Example Embodiment

A second example embodiment of the present disclosure will be described below. The second example embodiment is a basic example embodiment common to the above first example embodiment and its modifications.

Figure 14A:
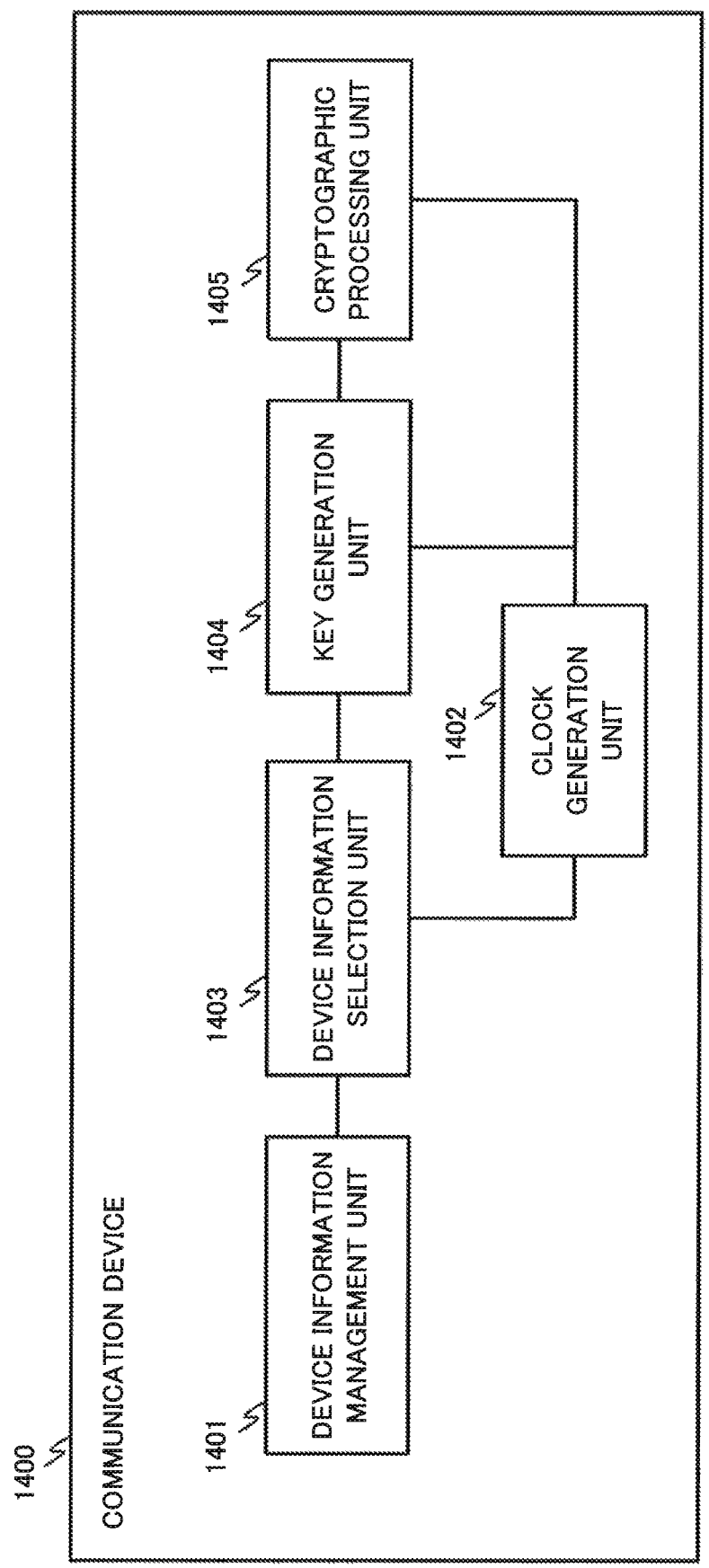
FIG. 14A is a block diagram illustrating a functional configuration of a communication device according to a second example embodiment of the present disclosure.

FIG. 14A is a block diagram illustrating the functional configuration of a communication device 1400 according to the present example embodiment. Note that, for example, the communication device 1400 can be realized by hardware exemplified in FIG. 2A to FIG. 2C.

Figure 14B:
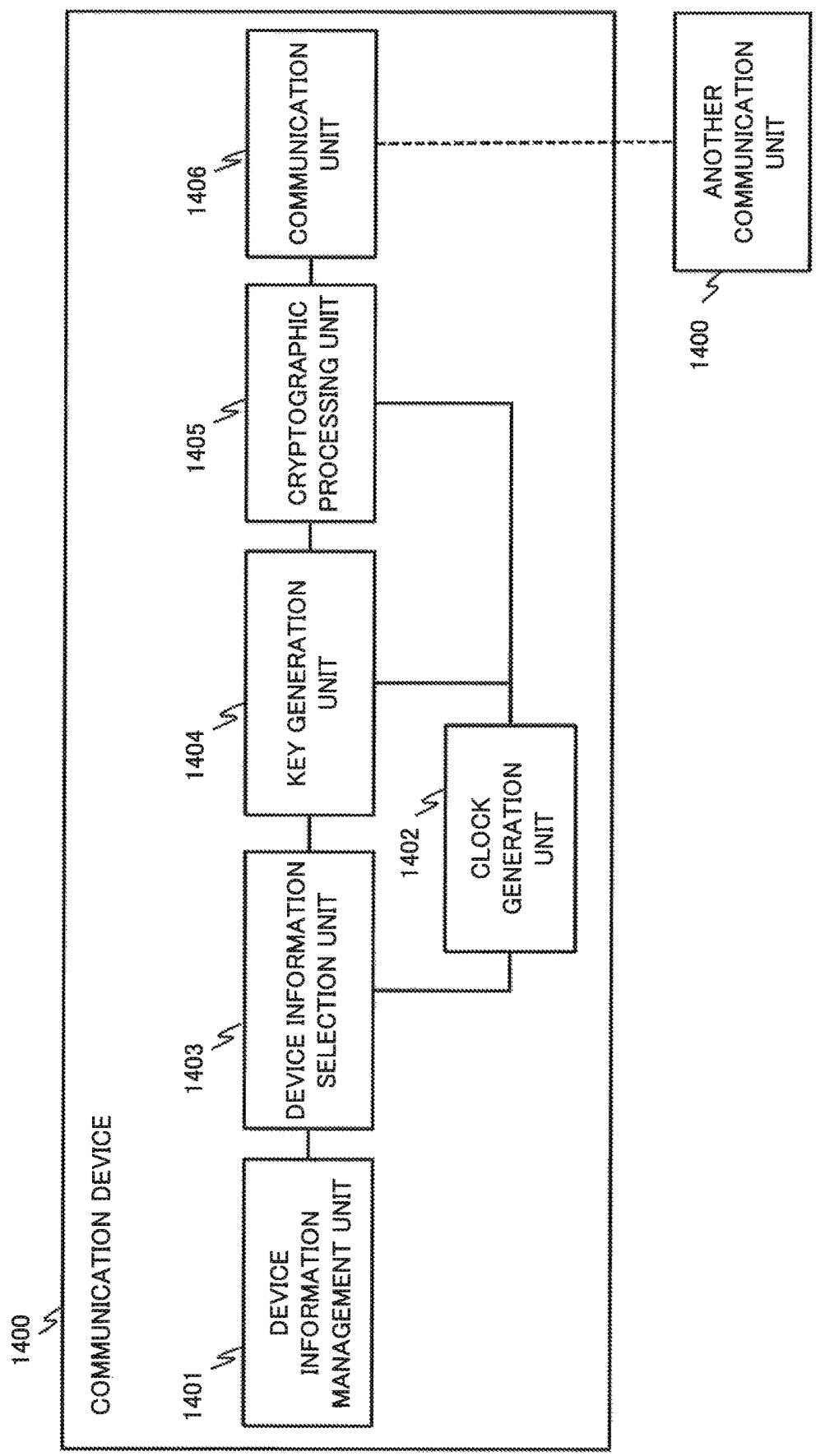
FIG. 14B is a block diagram illustrating another functional configuration of the communication device according to the second example embodiment of the present disclosure.

As illustrated in FIG. 14A, the communication device 1400 includes a device information management unit 1401, a clock generation unit 1402, a device information selection unit 1403, a key generation unit 1404, and a cryptographic processing unit 1405. The communication device 1400 may include a communication unit 1406 as illustrated in FIG. 14B. These constituent elements constituting the communication device 1400 may be connected by using an appropriate method so that data can be transferred to each other. Each constituent element will be described below.

The device information management unit 1401 (device information management means) stores the device information which is information commonly stored in one or more communication devices. Such device information may be, for example, same information as the device information according to the first example embodiment. For example, the device information management unit 1401 may store individual device information for another communication device 1400 with which the own device communicates. For example, the device information management unit 1401 may be configured to be able to execute the same processing as the device information management unit 101 according to the first example embodiment.

The clock generation unit 1402 (clock generation means) generates the clock information representing timing by using the periodic clock signal. The clock generation unit 1402 may generate the clock information by using a highly accurate clock signal generated by using, for example, an atomic clock or the like. For example, the clock information generated by the clock generation unit 1402 may include, as in the first example embodiment, information representing time, or may include information represent a counter value. The clock generation unit 1402 may be configured, for example, to perform processing similar to the clock generation unit 102 according to the first example embodiment.

The device information selection unit 1403 (device information selection means) selects at least a part of one or more pieces of the device information according to the clock information generated by the clock generation unit 1402. Further, the device information selection unit 1403 generates the selection information, which is different information for each of the clock information, from at least a part of the selected device information. For example, the device information selection unit 1403 may generate the selection information by using the device information selected by the selection algorithm described in the first example embodiment. The device information selection unit 1403 may be configured to perform the same processing as the device information selection unit 103 according to the first example embodiment.

The key generation unit 1404 (key generation means) generates the encryption key by using at least the clock information and the selection information generated by the device information selection unit. As a result, the key generation unit 1404 can generate different encryption keys according to the selection information and the clock information. The key generation unit 1404 may be configured, for example, to perform processing similar to the key generation unit 104 according to the first example embodiment.

The cryptographic processing unit 1405 (cryptographic processing means) executes at least one of encryption processing and decryption processing by using the encryption key generated in the key generation unit 1404. For example, the cryptographic processing unit 1405 may be configured to perform processing similar to the cryptographic processing unit 105 according to the first example embodiment.

The communication unit 1406 (communication means) is configured to transmit and receive the communication data with another communication device 1400. The communication unit 1406, for example, transmits the communication data encrypted in the cryptographic processing unit 1405 to another communication device 1400. For example, the communication unit 1406 receives the encrypted communication data from another communication device 1400, and provides it to the cryptographic processing unit 1405. For example, the communication unit 1406 may be configured to perform processing similar to the communication unit 106 in the first example embodiment.

The communication device 1400 configured as described above can execute encryption communication with another communication device 1400 without explicitly distributing the encryption key used for encryption communication to another communication device 1400. Further, the communication device 1400 configured as described above can execute encryption communication without sharing the encryption key in advance. The reason is that when the clock information generated by each communication device has the same contents, each communication device 1400 can generate the same encryption key as that of another communication device 1400 based on the device information common to another communication device 1400 and the clock information. Further, when updating the encryption key, the communication device 1400 can generate different encryption keys according to the clock information. As described above, each communication device 1400 can execute encryption communication with another communication device 1400 by using the appropriate encryption key.

The foregoing has been described as an example in which the present disclosure is applied to the above-described exemplary example embodiment. In each of the above example embodiments, an example in which the technology related to the present disclosure is applied to the communication device (100, 1400) has been described. For example, by operating the communication device (100, 1400) according to each of the above example embodiments, a communication method according to the present disclosure can be realized. The method of realizing the communication method according to the present disclosure is not limited to the above. The communication method according to the present disclosure can be realized by an appropriate device (an information processing device such as a computer, a dedicated embedded apparatus, or the like) which is capable of performing the same operation as the communication device (100, 1400). Note that the present disclosure may be realized as a system including a plurality of communication devices (100, 1400).

Further, the technical scope of the present disclosure is not limited to the range described in each of the example embodiments and modifications described above. It will be clear to those skilled in the art that various modifications or improvements can be made to such example embodiments. In such a case, a new example embodiment with such modification or improvement can also be included in the technical scope of the present disclosure. Furthermore, example embodiments in which each of the above-described example embodiments and modifications, or a combination of new example embodiments with such modifications or improvements is also included in the technical scope of the present disclosure. This should be clearly understood from the recitation set forth in the claims.

The whole or part of the exemplary example embodiments disclosed above can be described as, but not limited to, the following supplementary notes.

(Supplementary note 1)

A communication device includes:

a memory; and at least one processor coupled to the memory, the processor performing operations, the operations includes:

storing device information that is information stored commonly in one or more communication devices;

generating clock information representing timing by using a periodic clock signal;

selecting at least a part of the device information according to the clock information;

generating selection information that is different information for each piece of the clock information from at least a part of the device information selected;

generating an encryption key by using at least the clock information and the selection information generated; and executing at least one of encryption processing and decryption processing on communication data by using the encryption key generated.

(Supplementary note 2)

The communication device according to supplementary note 1, wherein the operations further includes storing a plurality of pieces of the device information, in accordance with the clock information, selecting at least a part of the device information by executing at least one of:

selecting at least one or more pieces of the device information from a plurality of pieces of the device information; and with selecting at least one or more pieces of the device information from a plurality of pieces of the device information, dividing each of the selected pieces of the device information into a plurality of parts, and further selecting one or more divided parts from each of selected pieces of the device information.

(Supplementary note 3)

The communication device according to supplementary note 1 or 2, further includes: an atomic clock, wherein the operations further includes generating the clock signal synchronized with another communication device by using the atomic clock.

(Supplementary note 4)

The communication device according to supplementary note 1 or 2, wherein the operations further includes adjusting timing of the clock signal based on time information that is generated by using an atomic clock and provided from an outside of the own device.

(Supplementary note 5)

The communication device according to any one of supplementary notes 1 to 4, further includes:

wherein the operations further includes transmitting and receiving the communication data with the another communication device, when not correctly decrypting the communication data received from another communication device, generating one or more pieces of first estimated clock information that is the clock information different from the clock information in the own device at the time when the communication data is received, selecting at least a part of the device information according to the first estimated clock information, generating the selection information from at least the selected part of the device information, generating a first estimated encryption key by using at least the first estimated clock information and the selection information, and estimating the clock information generated by the another communication device according to a result of determining whether or not the communication data received from the communication device is correctly decrypted by using the generated first estimated encryption key.

(Supplementary note 6)

The communication device according to any one of supplementary notes 1 to 4, wherein the operations further includes transmitting and receiving the communication data with the another communication device, when receiving, from the another communication device, a notification representing that the communication data transmitted from the own device is not correctly decrypted, generating one or more pieces of second estimated clock information that is the clock information different from the clock information in the own device, selecting at least a part of the device information according to the second estimated clock information, generating the selection information from at least the selected part of the device information, generating a second estimated encryption key by using at least the second estimated clock information and the selection information, transmitting, to the another communication device, the communication data encrypted by using the second estimated encryption key, when receiving, from the another communication device, a notification representing that the communication data encrypted by using the second estimated encryption key is correctly decrypted, estimating the second estimated clock information as the clock information generated at the another communication device.

(Supplementary note 7)

The communication device according to supplementary note 5 or 6, wherein the operations further includes storing adjustment information representing the difference between the clock information estimated for the another communication device and the clock information generated in the own device in association with the another communication device, when the own device is the communication device of reception side that receives the communication data from the another communication device, with adjusting the clock information generated by using the adjustment information, generating the selection information by using the clock information after being adjusted, with adjusting the clock information generated by using the adjustment information, generating the encryption key by using the clock information after being adjusted and the selection information generated, and decrypting the communication data received by using the encryption key generated.

(Supplementary note 8)

The communication device according to supplementary note 5 or 6, wherein the operations further includes storing adjustment information representing the difference between the clock information estimated for the another communication device and the clock information generated in the own device in association with the another communication device, when the own device is the communication device of transmission side that transmits the communication data to the another communication device, with adjusting the clock information generated by using the adjustment information, generating the selection information by using the clock information after being adjusted, with adjusting the clock information generated by using the adjustment information, generating the encryption key by using the clock information after being adjusted and the selection information generated, and encrypting the communication data transmitted by using the encryption key generated.

(Supplementary note 9)

The communication device according to any one of supplementary notes 5 to 8, wherein the operations further includes storing, as the device information, a pre-shared key commonly stored by all the communication devices and information unique to the own device, encrypting the communication data including information unique to the own device by using the pre-shared key, transmitting the encrypted communication data to another communication device, when receiving the communication data including information unique to the another communication device from the another communication device, decrypting the communication data received by using the pre-shared key, and providing the information unique to the another device included in the decrypted communication data.

(Supplementary note 10)

The communication device according to supplementary note 2, wherein the operations further includes calculating a hash value of data including at least a part of pieces of the selected device information and the clock information generated, and providing the calculated hash value as the selection information.

(Supplementary note 11)

The communication device according to supplementary note 2 or 10, wherein the operations further includes including a plurality of selection techniques for selecting at least a part of the device information being respectively different in accordance with the clock information, selecting one or more the selection techniques depending on the clock information, and generating the selection information by using at least a part of the device information selected by using the selection technique selected.

(Supplementary note 12)

A communication system includes:

a transmission side communication device; and a reception side communication device, each of the transmission side communication device and the reception side communication device being the communication device according to supplementary note 7, wherein the operations in the transmission side communication device includes encrypting the communication data by using the encryption key generated according to the clock information generated by the clock in the transmission side communication device, and transmitting the encrypted communication data to the reception side communication device, and the operations in the reception side communication device includes adjusting the clock information generated in the reception side communication device by using the adjustment information, and decrypting the communication data received from the transmission side communication device by using the encryption key by using the adjusted clock information.

(Supplementary note 13)

A communication system includes:

a transmission side communication device; and a reception side communication device, each of the transmission side communication device and the reception side communication device being the communication device according to supplementary note 8, wherein the operations in the transmission side communication device includes adjusting the clock information generated in the transmission side communication device by using the adjustment information, encrypting the communication data by using the encryption key according to the clock information after being adjusted, and transmitting the encrypted communication data to the reception side communication device, and the operations in the reception side communication device includes decrypting the communication data received from the transmission side communication device by using the encryption key in accordance with the clock information in the reception side communication device.

(Supplementary note 14)

A communication method includes:

generating clock information representing timing by using a periodic clock signal;

selecting at least a part of device information that is information commonly stored in one or more communication devices in accordance with the clock information;

generating selection information that is different information for each piece of the clock information from at least a part of the device information selected;

generating an encryption key by using at least the clock information and the selection information generated; and executing at least one of encryption processing and decryption processing on communication data by using the encryption key generated.

(Supplementary note 15)

A non-transitory computer-readable recording medium embodying a program, the program causing a computer to perform a method, the method includes:

generating clock information representing timing by using a periodic clock signal;

selecting at least a part of the device information that is information commonly stored in one or more communication devices in accordance with the clock information;

generating selection information that is different information for each piece of the clock information from at least part of the device information selected;

generating an encryption key by using at least the clock information and the selection information generated; and executing at least one of encryption processing and decryption processing on communication data by using the encryption key generated.

REFERENCE SIGNS LIST

100 Communication device
101 Device information management unit
102 Clock generation unit
103 Device information selection unit
104 Key generation unit
105 Cryptographic processing unit
106 Communication unit
107 Data transfer unit
201 Processor
202 Memory
203 Clock generator
204 Communication interface
205 Storage
206 Input and/or output interface
207 Input and/or output device
208 Drive device
209 Storage medium
210 Cryptographic processing device
1400 Communication device
1401 Device information management unit
1402 Clock generation unit
1403 Device information selection unit
1404 Key generation unit
1405 Cryptographic processing unit

The invention claimed is:

1. A communication device comprising:

a memory; and at least one processor coupled to the memory, the processor performing operations, the operations comprising:

storing device information that is information stored commonly in one or more communication devices;

generating clock information representing timing by using a periodic clock signal;

selecting at least a part of the device information according to the clock information;

generating selection information that is different information for each piece of the clock information from at least a part of the device information selected;

generating an encryption key by using at least the clock information and the selection information generated;
executing at least one of encryption processing and decryption processing on communication data by using the encryption key generated;
transmitting and receiving the communication data with the another communication device, when not correctly decrypting the communication data received from another communication device,
generating one or more pieces of first estimated clock information that is the clock information different from the clock information in the own device at the time when the communication data is received,
selecting at least a part of the device information according to the first estimated clock information, generating the selection information from at least the selected part of the device information,
generating a first estimated encryption key by using at least the first estimated clock information and the selection information, and
estimating the clock information generated by the another communication device according to a result of determining whether or not the communication data received from the communication device is correctly decrypted by using the generated first estimated encryption key.

2. The communication device according to claim 1,
wherein the operations further comprises
storing a plurality of pieces of the device information, in accordance with the clock information, selecting at least a part of the device information by executing at least one of:
selecting at least one or more pieces of the device information from a plurality of pieces of the device information; and
with selecting at least one or more pieces of the device information from a plurality of pieces of the device information, dividing each of the selected pieces of the device information into a plurality of parts, and further selecting one or more divided parts from each of selected pieces of the device information.

3. The communication device according to claim 1,
further comprising: an atomic clock,
wherein the operations further comprises
generating the clock signal synchronized with another communication device by using the atomic clock.

4. The communication device according to claim 1,
wherein the operations further comprises
adjusting timing of the clock signal based on time information that is generated by using an atomic clock and provided from an outside of the own device.

5. The communication device according to claim 1,
wherein the operations further comprises
transmitting and receiving the communication data with the another communication device,
when receiving, from the another communication device, a notification representing that the communication data transmitted from the own device is not correctly decrypted,
generates generating one or more pieces of second estimated clock information that is the clock information different from the clock information in the own device,
selecting at least a part of the device information according to the second estimated clock information, generating the selection information from at least the selected part of the device information,
generating a second estimated encryption key by using at least the second estimated clock information and the selection information,
transmitting, to the another communication device, the communication data encrypted by using the second estimated encryption key,
when receiving, from the another communication device, a notification representing that the communication data encrypted by using the second estimated encryption key is correctly decrypted, estimating the second estimated clock information as the clock information generated at the another communication device.

6. The communication device according to claim 1,
wherein the operations further comprises
storing adjustment information representing the difference between the clock information estimated for the another communication device and the clock information generated in the own device in association with the another communication device,
when the own device is the communication device of reception side that receives the communication data from the another communication device, with adjusting the clock information generated by using the adjustment information, generating the selection information by using the clock information after being adjusted, with adjusting the clock information generated by using the adjustment information, generating the encryption key by using the clock information after being adjusted and the selection information generated, and
decrypting the communication data received by using the encryption key generated.

7. The communication device according to claim 1,
wherein the operations further comprises
storing adjustment information representing the difference between the clock information estimated for the another communication device and the clock information generated in the own device in association with the another communication device,
when the own device is the communication device of transmission side that transmits the communication data to the another communication device, with adjusting the clock information generated by using the adjustment information, generating the selection information by using the clock information after being adjusted, with adjusting the clock information generated by using the adjustment information, generating the encryption key by using the clock information after being adjusted and the selection information generated, and
encrypting the communication data transmitted by using the encryption key generated.

8. The communication device according to claim 1,
wherein the operations further comprises
storing, as the device information, a pre-shared key commonly stored by all the communication devices and information unique to the own device,
encrypting the communication data including information unique to the own device by using the pre-shared key,
transmitting the encrypted communication data to another communication device,
when receiving the communication data including information unique to the another communication device from the another communication device, decrypting the communication data received by using the pre-shared key, and providing the information unique to the another device included in the decrypted communication data.

9. The communication device according to claim 2,
wherein the operations further comprises
calculating a hash value of data including at least a part of pieces of the selected device information and the clock information generated, and providing the calculated hash value as the selection information.

10. The communication device according claim 2,
wherein the operations further comprises
including a plurality of selection techniques for selecting at least a part of the device information being respectively different in accordance with the clock information,
selecting one or more the selection techniques depending on the clock information, and generating the selection information by using at least a part of the device information selected by using the selection technique selected.

11. A communication method comprising:
generating clock information representing timing by using a periodic clock signal;
selecting at least a part of device information that is information commonly stored in one or more communication devices in accordance with the clock information;
generating selection information that is different information for each piece of the clock information from at least a part of the device information selected;
generating an encryption key by using at least the clock information and the selection information generated;
executing at least one of encryption processing and decryption processing on communication data by using the encryption key generated;
transmitting and receiving the communication data with the another communication device, when not correctly decrypting the communication data received from another communication device,
generating one or more pieces of first estimated clock information that is the clock information different from the clock information in the own device at the time when the communication data is received,
selecting at least a part of the device information according to the first estimated clock information, generating the selection information from at least the selected part of the device information,
generating a first estimated encryption key by using at least the first estimated clock information and the selection information, and
estimating the clock information generated by the another communication device according to a result of determining whether or not the communication data received from the communication device is correctly decrypted by using the generated first estimated encryption key.

12. A non-transitory computer-readable recording medium embodying a program for, the program causing a computer to perform a method, the method comprising:
generating clock information representing timing by using a periodic clock signal;
selecting at least a part of the device information that is information commonly stored in one or more communication devices in accordance with the clock information; generating selection information that is different information for each piece of the clock information from at least part of the device information selected;
generating an encryption key by using at least the clock information and the selection information generated; and
executing at least one of encryption processing and decryption processing on communication data by using the encryption key generated;
transmitting and receiving the communication data with the another communication device, when not correctly decrypting the communication data received from another communication device,
generating one or more pieces of first estimated clock information that is the clock information different from the clock information in the own device at the time when the communication data is received,
selecting at least a part of the device information according to the first estimated clock information, generating the selection information from at least the selected part of the device information,
generating a first estimated encryption key by using at least the first estimated clock information and the selection information, and
estimating the clock information generated by the another communication device according to a result of determining whether or not the communication data received from the communication device is correctly decrypted by using the generated first estimated encryption key.

\* \* \* \* \*